(12) United States Patent
Okamoto et al.

(10) Patent No.: US 7,036,843 B2
(45) Date of Patent: May 2, 2006

(54) AIRBAG DEVICE AND METHOD FOR INFLATING THE SAME

(75) Inventors: Yutaka Okamoto, Wako (JP); Yuji Kikuchi, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 288 days.

(21) Appl. No.: 10/652,629

(22) Filed: Aug. 29, 2003

(65) Prior Publication Data
US 2004/0041375 A1 Mar. 4, 2004

(30) Foreign Application Priority Data
Aug. 30, 2002 (JP) ............... 2002-255866

(51) Int. Cl.
*B60R 21/24* (2006.01)
(52) U.S. Cl. .................. 280/728.3; 280/729; 280/739
(58) Field of Classification Search ............ 280/728.3, 280/729, 732, 739; 180/274
See application file for complete search history.

(56) References Cited

U.S. PATENT DOCUMENTS

| | | | |
|---|---|---|---|
| 5,100,172 A | | 3/1992 | VanVoorhies et al. |
| 5,496,059 A | * | 3/1996 | Bauer ..................... 280/728.3 |
| 5,704,639 A | * | 1/1998 | Cundill et al. ............. 280/739 |
| 6,406,055 B1 | | 6/2002 | Faigle et al. |
| 6,457,744 B1 | | 10/2002 | Tonooka |
| 6,659,499 B1 | * | 12/2003 | Jenkins ..................... 280/735 |
| 6,786,505 B1 | * | 9/2004 | Yoshida ..................... 280/729 |

FOREIGN PATENT DOCUMENTS

| | | |
|---|---|---|
| DE | 199 12 369 A1 | 10/2000 |
| DE | 199 60 251 A1 | 6/2001 |
| JP | 11334520 A | 12/1999 |
| JP | 2000-272465 | 10/2000 |
| WO | WO 99/64273 | 12/1999 |

* cited by examiner

*Primary Examiner*—David R. Dunn
(74) *Attorney, Agent, or Firm*—Hamre, Schumann, Mueller & Larson, P.C.

(57) ABSTRACT

The present invention provides an airbag device for, upon collision of a vehicle carrying the airbag device with an obstacle, mitigating the impact of collision of the obstacle with an inflated airbag. The airbag device includes a bag housing case and a cover. A main airbag and a cover opening bag are housed in deflated, folded states within the bag housing case. First, the cover opening bag inflates by the inflow of gas, opening the cover. Gas also flows into the main airbag through the cover opening bag, thereby inflating the main airbag. If an obstacle collides with the inflated main airbag, a bag pressure release mechanism provided at the bottom of the bag housing case opens the main airbag, releasing gas within the main airbag and mitigating the impact on the obstacle.

10 Claims, 21 Drawing Sheets

AIRBAG DEVICE AND METHOD FOR INFLATING THE SAME

FIELD OF THE INVENTION

The present invention relates to an airbag device which inflates an airbag when a vehicle carrying the air bag device collides with an obstacle, to mitigate the resultant impact on the obstacle, and to a method for inflating the same.

BACKGROUND OF THE INVENTION

Collisions of vehicles with obstacles have some conceivable patterns. It is conceivable that an obstacle after striking the front bumper of a vehicle again strikes another portion of the vehicle. The first collision of the obstacle with the front bumper is called a "primary collision," and the next collision with another portion of the vehicle is called a "secondary collision."

There is an airbag device with an airbag which is inflated with gas generated by an inflator immediately after a primary collision, covering a vehicle outside portion such as an A-pillar or a windshield for mitigating an impact in a secondary collision of an obstacle with the vehicle outside portion.

When collided by an obstacle, an airbag having a high internal pressure for mitigating a secondary collision of the obstacle, however, can fail to sufficiently mitigate an impact on the obstacle. To solve the problem, a method of reducing the internal pressure of an airbag by releasing gas therein to the outside upon collision of an obstacle with the airbag seems possible.

To release gas within an airbag to the outside, it is required to provide a vent hole in the airbag to release gas by use of an internal pressure for inflating the airbag, for example.

A vehicle having a relatively long distance between the front bumper and the windshield, however, causes an obstacle to take a relatively long period of time between a primary collision with the front bumper and a secondary collision with the airbag. During that period, gas within the airbag is continuously discharged through the vent hole.

It is thus required to feed a large amount of gas into the airbag in view of a discharged amount of gas so as to keep the airbag in an inflated state. It is, however, required to increase the gas supply capacity of an inflator to feed a large amount of gas into the airbag, which prevents reduction in size of the airbag device.

For a method to solve the problem, JP-A-11-334520 discloses an "Airbag Device," for example.

This airbag device has a control valve switched between energization and de-energization for opening and closing a vent hole, an internal pressure sensor for detecting the internal pressure of an airbag to control the control valve, and a controller for controlling the control valve.

In the above device, when the airbag starts inflating, the vent hole is closed by the control valve. When an obstacle secondarily collides with the airbag which has been fully inflated, increasing the internal pressure of the airbag to a predetermined value, the sensor detects the internal pressure of the airbag and the control valve is actuated based on the detection signal to open the vent hole. In this manner, it is possible not to discharge gas through the vent hole when the airbag starts inflating upon a collision of the vehicle with an obstacle, and to release gas to the outside through the vent hole when the obstacle is in a secondary collision with the airbag. The discharged amount of gas can thus be reduced to reduce the capacity of the inflator. In addition, the release of gas to the outside through the vent hole in the secondary collision of the obstacle with the airbag allows efficient mitigation of impact on the obstacle.

As stated above, the use of the airbag device in JP-A-11-334520 can provide sufficient effects in the reduction of capacity of the inflator and also the efficient absorption of impact on an obstacle.

This airbag device, however, needs to be provided with the internal pressure sensor, control valve and controller, which tend to relatively complicate the structure of the airbag device, preventing size reduction of the airbag device.

In this context, an airbag device capable of efficiently mitigating an impact on an obstacle and having a simplified structure for size reduction and a method of inflating the airbag device are desired.

SUMMARY OF THE INVENTION

According to an aspect of the present invention, there is provided an airbag device which comprises: a bag housing case; a first airbag housed in a deflated, folded state within the bag housing case, for opening a cover of the bag housing case by an inflating force of the first airbag when inflating; a second airbag housed in a deflated, folded state within the bag housing case, for mitigating an impact on an obstacle by inflation after the cover is opened; and a bag pressure release mechanism having a closure member for opening the inflated second airbag when an internal pressure of the second airbag reaches a predetermined pressure so as to release gas within the second airbag to the outside.

With the first and second airbags housed in deflated, folded states within the bag housing case, gas is first fed into the first airbag to inflate the first airbag. With the inflating force, the cover of the bag housing case is opened. In this manner, the cover is opened by the inflating force of the first airbag so as not to open the bag pressure release mechanism but to only open the cover.

After the cover is opened, the second airbag is inflated. At that time, since the cover of the bag housing case has already been opened, no member obstructs the inflation of the second airbag, causing the internal pressure of the second airbag to increase to a pressure to open the bag pressure release mechanism. With this state, if an obstacle collides with the inflated second airbag, for example, the internal pressure of the second airbag rapidly increases to a predetermined pressure. Under the predetermined pressure, the bag pressure release mechanism is opened. The opening of the bag pressure release mechanism allows gas within the second airbag to be discharged outside to mitigate an impact on the obstacle.

Further, in the present invention, since the second airbag can be inflated with the bag pressure release mechanism kept closed, gas is prevented from being discharged outside through the bag pressure release mechanism until an obstacle collides with the second airbag. An inflator of a small capacity can thus be used to reduce the size of the airbag device.

Furthermore, in the present invention, the combination of the first airbag for opening the cover and the second airbag for mitigating impact allows the bag pressure release mechanism to be opened only when needed, eliminating an internal pressure sensor, control valve and controller which have conventionally been required. The airbag device can thus have a simple structure, resulting in cost reduction.

The bag pressure release mechanism of the present invention preferably faces into the second airbag to ensure that the bag pressure release mechanism is opened if an obstacle collides with the second airbag, increasing the internal pressure of the second airbag to a predetermined pressure, for example. The opening of the bag pressure release mechanism ensures that gas within the second airbag escapes outside, mitigating an impact on the obstacle.

According to another aspect of the present invention, there is also provided a method of inflating an airbag device, which method comprises the steps of: inflating with gas a first airbag housed in a deflated, folded state within a bag housing case; opening a cover of the bag housing case with an inflating force of the first airbag; guiding gas within the first airbag into a second airbag housed in a deflated, folded state within the bag housing case; inflating the second airbag by inflow of the gas; opening a bag pressure release mechanism when an internal pressure of the inflated second airbag reaches a predetermined pressure; and discharging gas within the second airbag to the outside through the open bag pressure release mechanism.

After the cover of the bag housing case is opened by the inflating force of the first airbag, gas within the first airbag is guided into the second airbag to inflate the second airbag. At the inflation of the second airbag, since the cover of the bag housing case has already been opened, nothing obstructs the inflation of the second airbag, causing the internal pressure of the second airbag to increase to a pressure to open the bag pressure release mechanism. With this state, if an obstacle collides with the second airbag, the internal pressure of the second airbag increases to a predetermined pressure, opening the bag pressure release mechanism. With this, gas within the second airbag escapes to the outside.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
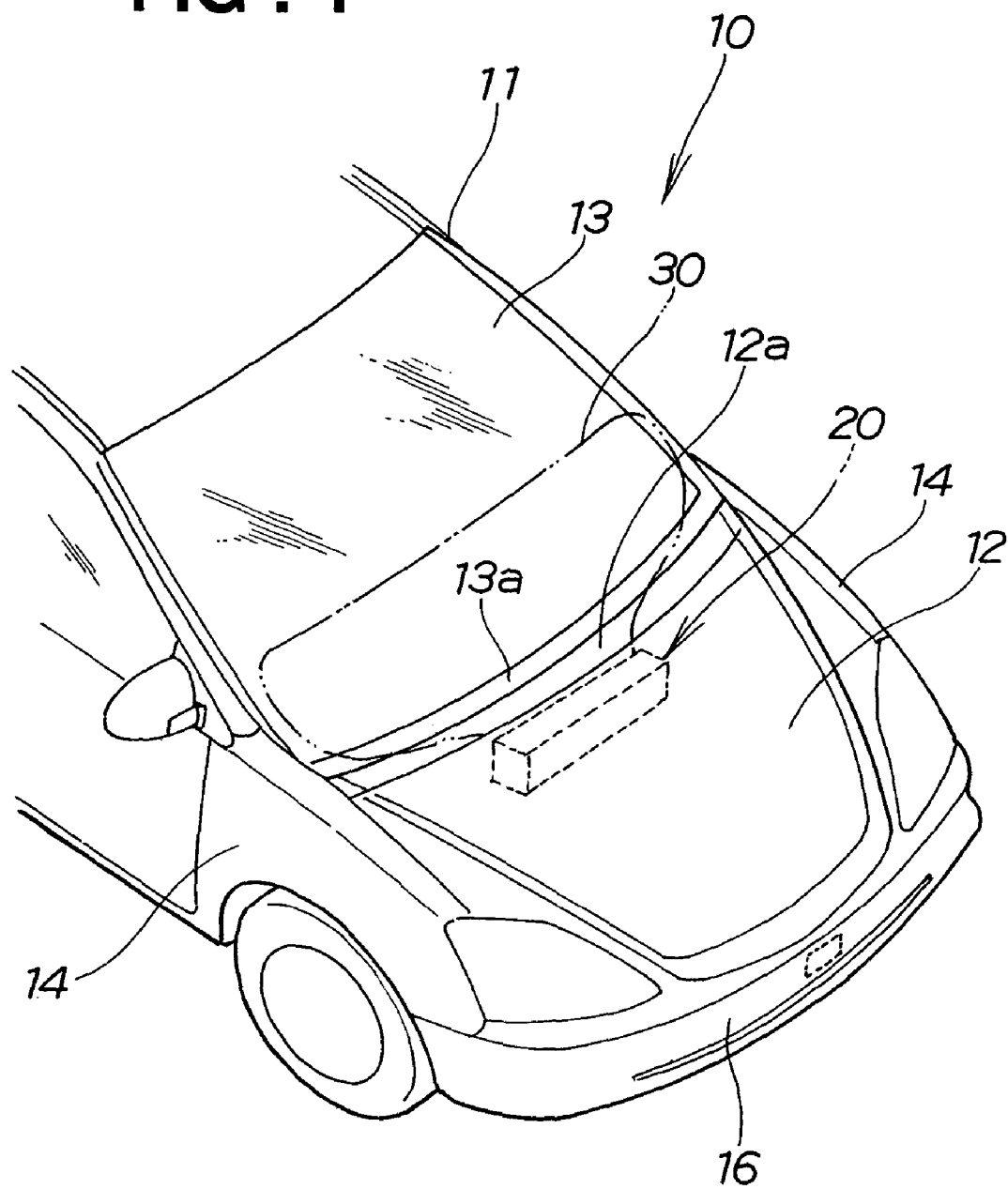
FIG. 1 is a perspective view of a vehicle with an airbag device according to the present invention.

A vehicle 10 shown in FIG. 1 has a bonnet 12 at the front of a vehicle body 11 and an airbag device 20 provided below a rear end 12*a* of the bonnet 12*a* in proximity to a bottom portion 13*a* of a windshield 13. In the figure, reference numeral 14 denotes a front wing and 16 a front bumper.

A main airbag 30 shown by imaginary lines is inflated and ballooned out from the airbag device 20 to the front of the windshield 13. Description will be made below about the airbag device 20.

FIGS. 2 to 10 illustrate an airbag device according to a first embodiment of the present invention.

Figure 2:
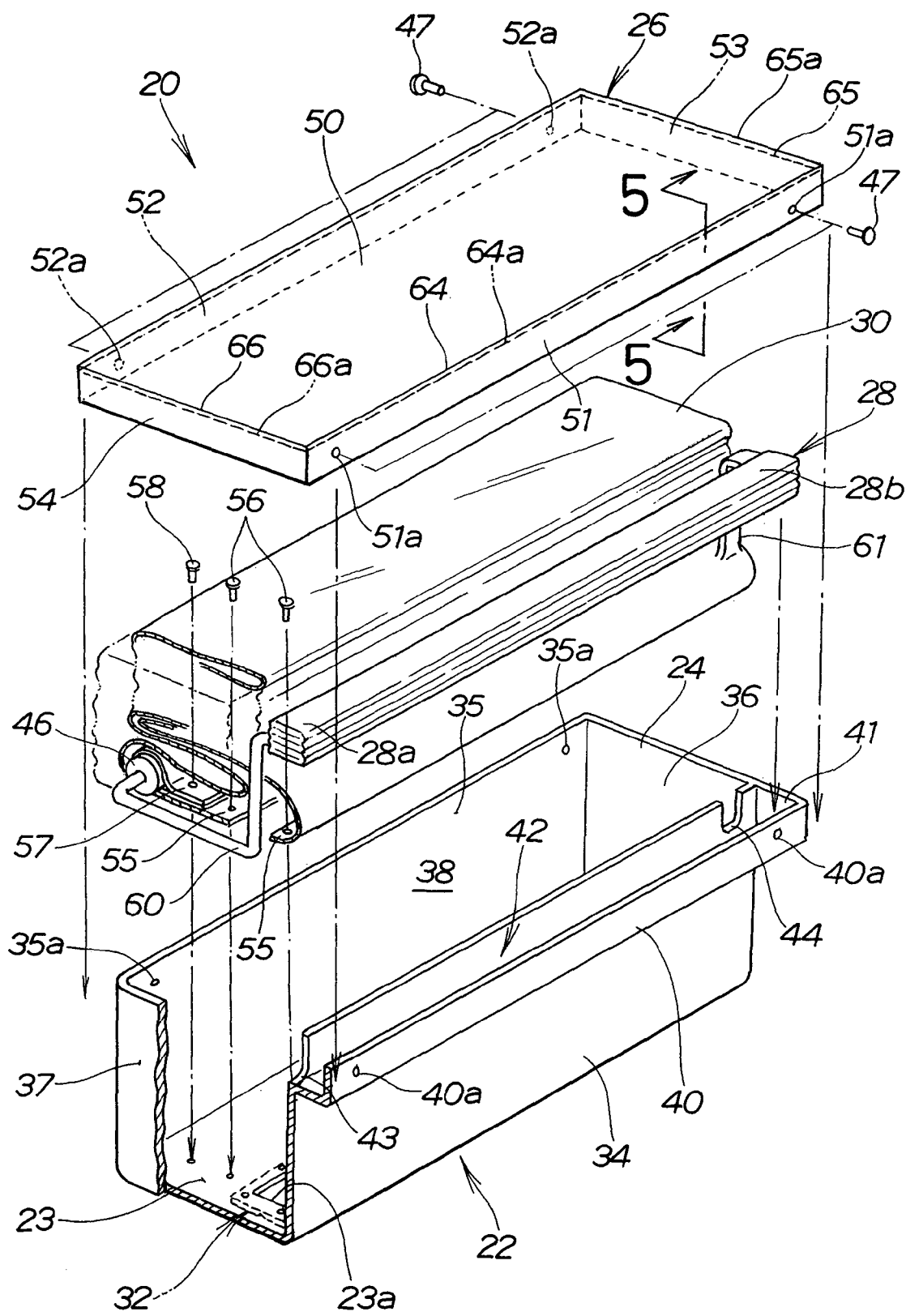
FIG. 2 is an exploded perspective view of an airbag device according to a first embodiment of the present invention.

Referring to FIG. 2, the airbag device 20 in the first embodiment has a bag housing case 22 provided below the rear end 12*a* of the bonnet 12 shown in FIG. 1, a cover 26 closing an opening 24 of the bag housing case 22, a cover opening bag 28 housed in the bag housing case 22, the main airbag 30, and a bag pressure release mechanism 32 provided at the bottom 23 of the bag housing case 22.

The bag housing case 22 has the bottom 23 formed in a rectangular shape and front, rear, left and right sidewalls 34, 35, 36 and 37 provided at the front, rear, left and right sides of the bottom 23, forming a main housing space 38. A substantially L-shaped protruded portion 40 is provided at an upper portion of the front sidewall 34. The left and right ends of the protruded portion 40 are closed by closing plates 41 (the right closing plate 41 is not shown) to form a sub-housing space 42 of a gutter-like cross section. The front sidewall 34 has a left U-shaped cut 44 and a right U-shaped cut 43 formed in its left and right upper edge portions.

The main housing space 38 houses an inflator 46 and the main airbag 30. The sub-housing space 42 houses the cover opening bag 28.

A vent hole 23a openable and closable by the bag pressure release mechanism 32 is formed in the bottom 23 of the bag housing case 22. Mounting holes 35a, 35a and 40a and 40a for fixing the cover 26 to the bag housing case 22 are formed in the rear sidewall 35 and the protruded portion 40 formed at the front side wall 34, respectively.

The cover 26 covers the opening 24 of the bag housing case 22, closing the bag housing case 22. The cover 26 consists of a cover plate 50 formed in a rectangular shape and front, rear, left and right sidewalls 51, 52, 53 and 54 provided at the front, rear, left and right sides of the cover plate 50.

The front sidewall 51 and the rear sidewall 52 have mounting holes 51a, 51a and 52a, 52a, respectively, for mounting the cover 26 onto the bag housing case 22.

Screws 47, 47 are fastened into the mounting holes 51a, 51a in the front sidewall 51 and the mounting holes 40a, 40a in the protruded portion 40, and screws 47, 47 are fastened into the mounting holes 52a, 52a in the rear sidewall 52 and the mounting holes 35a, 35a formed in the rear sidewall 35 of the bag housing case 22, whereby the cover 26 is secured to the bag housing case 22 to close the opening 24 of the bag housing case 22 with the cover 26.

The main airbag 30 is fixed at its lower ends 55, 55 to the bottom 23 of the bag housing case 22 with screws 56, 56 and housed in a deflated, folded state within the bag housing case 22. The inflator 46 is disposed within the main airbag 30. The inflator 46 has a mounting bracket 57 to be fixed with a screw 58 to the bottom 23 of the bag housing case 22.

Figure 3:
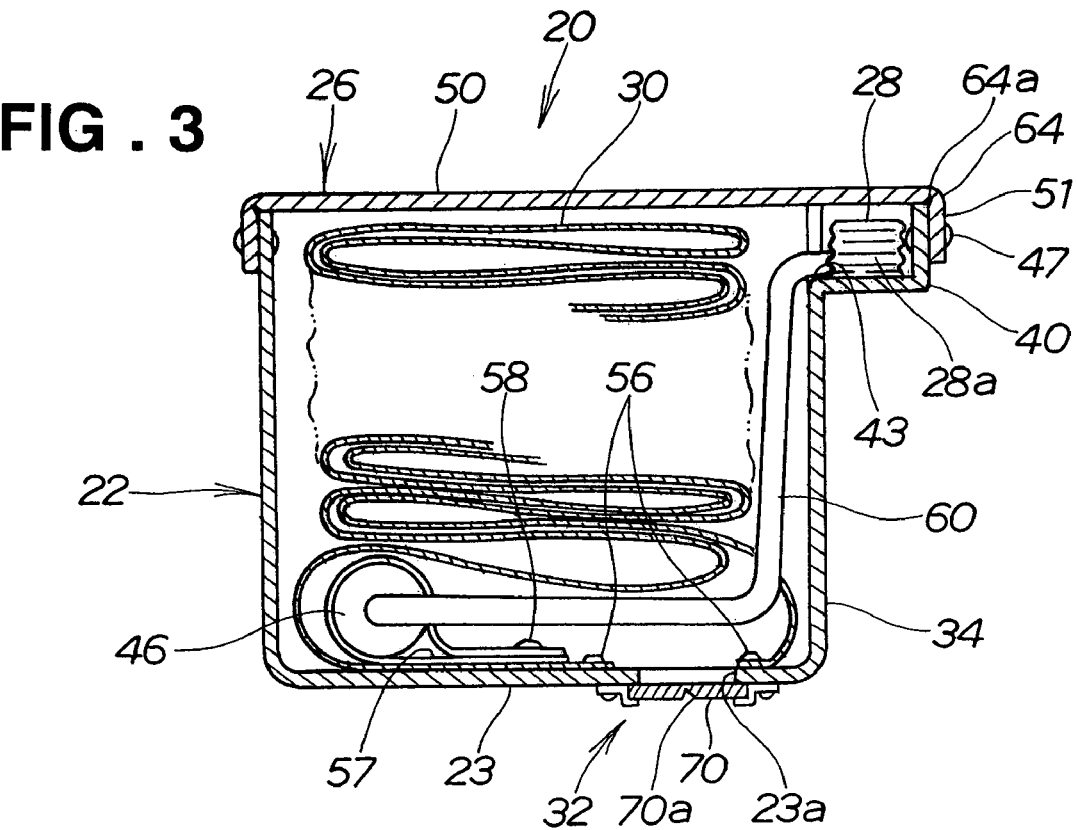
FIG. 3 is a cross-sectional view of the airbag device shown in FIG. 2, illustrating the relationship between an inflator provided within a main airbag and a cover opening bag.

The cover opening bag 28 is an airbag held in a deflated, folded state within the sub-housing space 42. The cover opening bag 28 communicates at its right end 28a with the inflator 46 via a gas supply pipe 60 as shown in FIG. 3. The inflator 46 supplies a high pressure gas contained therein to the cover opening bag 28 via the gas supply pipe 60. The cover opening bag 28 also communicates at its left end 28b with the main airbag 30 via a gas flow path 61 as shown in FIG. 4.

Figure 4:
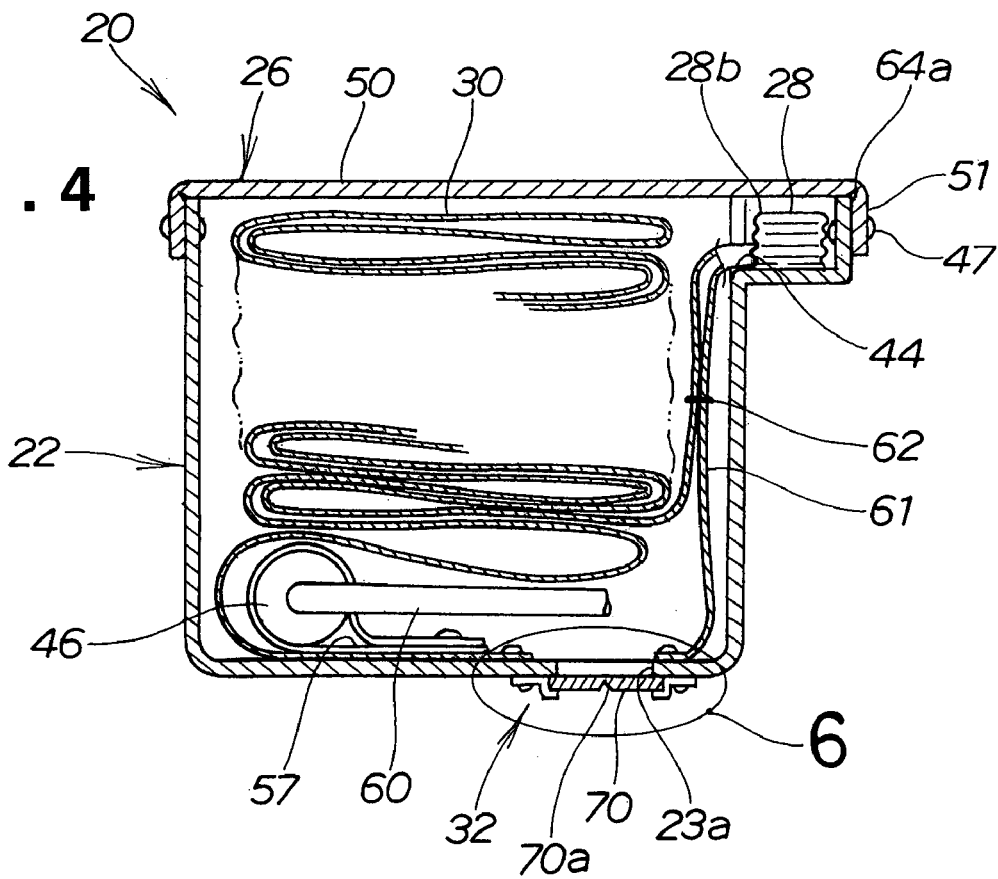
FIG. 4 is a cross-sectional view of the airbag device shown in FIG. 2, illustrating the relationship between the main airbag and the cover opening bag.

The gas flow path 61 has at its midpoint, as shown in FIG. 4, a gas flow path temporarily closing portion 62. When the internal pressure of the cover opening bag 28 reaches a certain value, the gas flow path temporarily closing portion 62 is broken under the internal pressure, and gas within the cover opening bag 28 is guided through the gas flow path 61 into the main airbag 30. The gas flow path temporarily closing portion 62 is illustrated with the example of stitching wall surfaces of the gas flow path 61 together to close the gas flow path 61, but the present invention is not limited thereto. The point is that the closing portion 62 is configured to be broken under the internal pressure of the cover opening bag 28 which has reached a certain value.

The gas flow path temporarily closing portion 62 may be provided at an upper portion of the gas flow path 61 (an end portion closer to the cover opening bag 28) or at a lower portion (an end portion closer to the main airbag 30) instead of being provided at a midpoint of the gas flow path 61.

Figure 5:
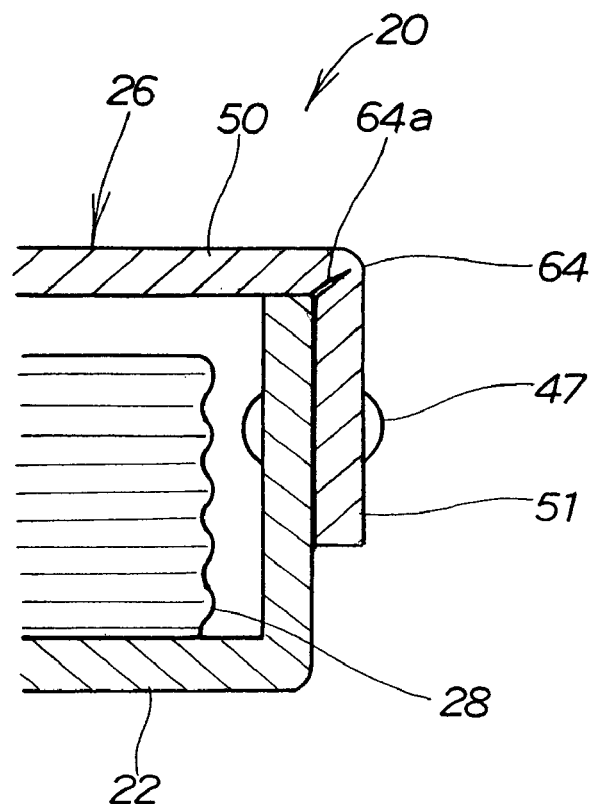
FIG. 5 is a cross-sectional view taken along line 5—5 of FIG. 2.

As shown in FIG. 5, the cover 26 has a thin break line (hereinafter referred to as a "front tear seam") 64a formed at a front corner 64 at which the front edge of the cover plate 50 as a component of the cover 26 and the front sidewall 51 meet.

The cover 26 also has, as shown in FIG. 2, as well as the front tear seam 64a formed at the front corner 64, a left tear seam 65a formed at a left corner 65 at which the left edge of the cover plate 50 and the left sidewall 53 meet, and a right tear seam 66a formed at a right corner 66 at which the right edge of the cover plate 50 and the right sidewall 54 meet.

Figure 6:
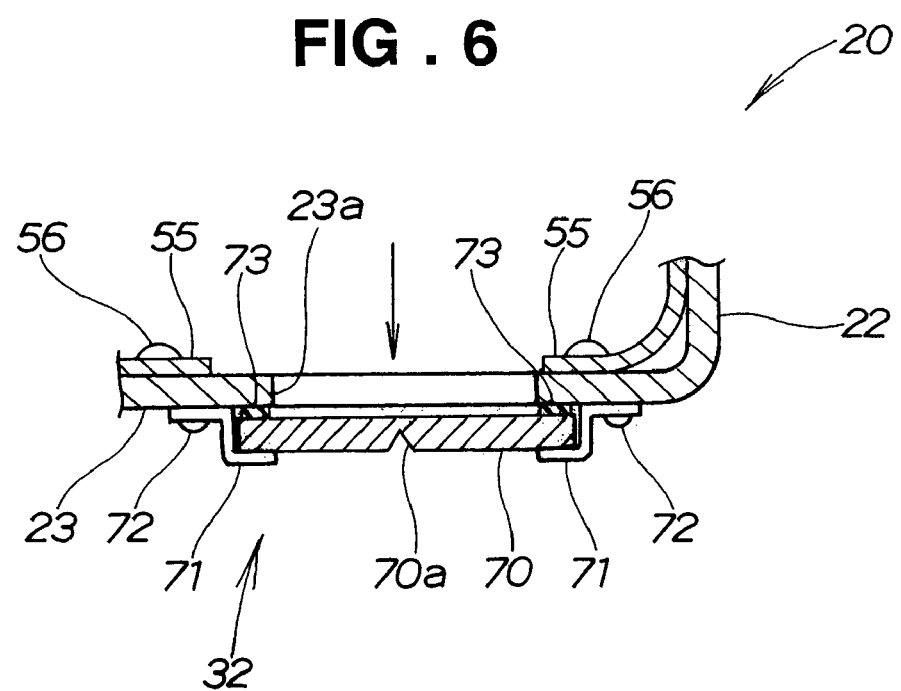
FIG. 6 is an enlarged view of portion 6 in FIG. 4, a cross-sectional view of a bag pressure release mechanism.

FIG. 6 illustrates the bag pressure release mechanism 32 mounted to the bottom 23 of the bag housing case 22.

The bag pressure release mechanism 32 has a resin plate 70 formed with a V-shaped notch 70a in the center. The resin plate 70 is opposite to the vent hole 23a formed in the bottom 23 of the bag housing case 22. Presser brackets 71, 71 support the resin plate 70. The pressure brackets 71, 71 are secured to the bottom 23 with screws 72, 72. A sealing member 73 is interposed between the resin plate 70 and the bottom 23. The vent hole 23a in the bottom 23 is closed by the resin plate 70 via the sealing member 73.

With the bag pressure release mechanism 32, when the internal pressure of the main airbag 30 acting on the resin plate 70 as shown by an arrow reaches a predetermined pressure (hereinafter referred to as a "release pressure"), the resin plate 70 breaks at the notch 70a under the internal pressure, opening the vent hole 23a in the bottom 23. Gas within the main airbag 30 is discharged outside through the vent hole 23a.

The release pressure is adjustable by changing the depth of the notch 70a in the resin plate 70. When the internal pressure of the main airbag 30 increases to the release pressure, the notch 70a breaks.

The bag pressure release mechanism 32 is made up with the resin plate 70, whereby the bag pressure release mechanism 32 can be relatively thin and disposed in a narrow space, reducing restrictions on the mounting space. The use of the resin plate 70 for the bag pressure release mechanism 32 increases corrosion resistance.

Since the main airbag 30 is inflated upward of the bag housing case 22, a mounting space for mounting the bag pressure release mechanism 32 to the bottom 23 of the bag housing case 22 can be easily found. The bag pressure release mechanism 32 is thus provided at the bottom 23 of the bag housing case 22 to reduce restrictions on mounting space for mounting the bag pressure release mechanism 32, and to facilitate the mounting of the bag pressure release mechanism 32.

Now, an operation of the airbag device 20 in the first embodiment will be described with reference to FIGS. 7 to 13.

Figure 7:
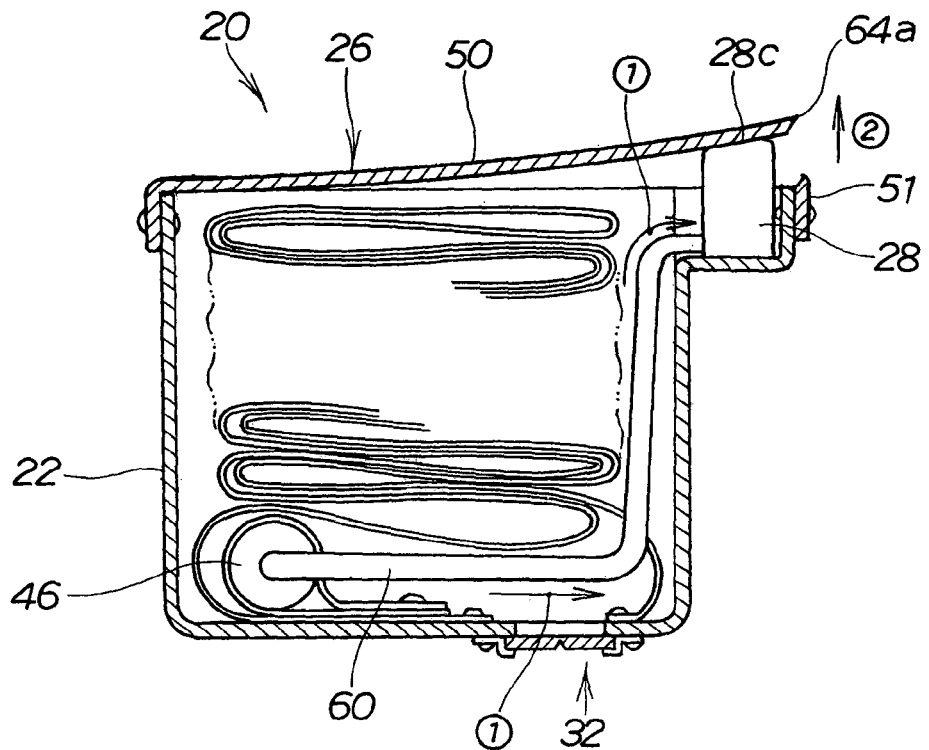
FIG. 7 is a cross-sectional view illustrating a method of inflating the airbag device according to the first embodiment of the present invention, illustrating a state in which gas starts being supplied by the inflator to the bag through the cover opening bag.

When the vehicle 10 shown in FIG. 1 collides with an obstacle, an igniter (not shown) is energized to ignite the inflator 46. As shown in FIG. 7, a high pressure gas generated by the inflator 46 flows into the cover opening bag 28 via the gas supply pipe 60, and the cover opening bag 28 inflates under the gas pressure. The top 28c of the cover opening bag 28 abuts on the rear surface of the cover plate 50 of the cover 26.

From this state, gas continuously flows into the cover opening bag 28, increasing the internal pressure of the cover opening bag 28 to a predetermined pressure P1, and causing a predetermined boosting force acting on the cover plate 50. The boosting force causes the cover plate 50 to break at the front tear seam 64a at the front corner 64, left tear seam 65a at the left corner 65 and right tear seam 66a at the right corner 66 shown in FIG. 2. The inflating cover opening bag 28 lifts the cover plate 50 as shown by arrow ②.

Figure 8:
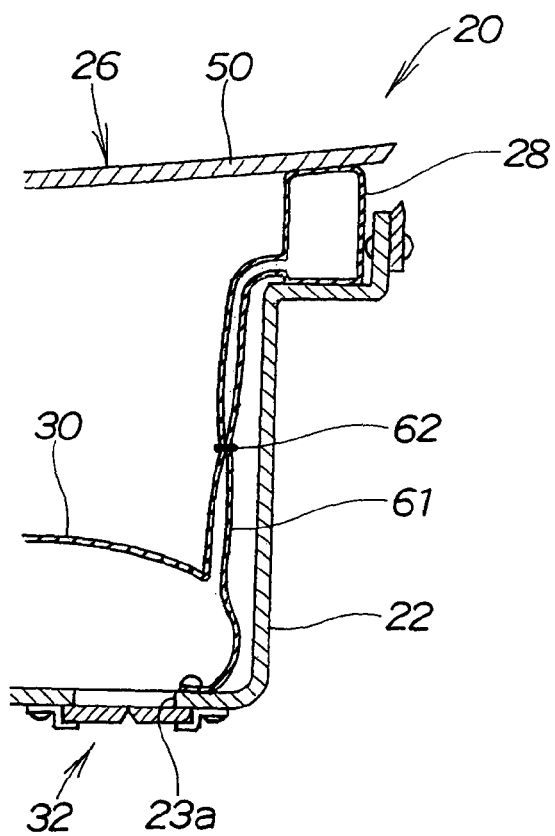
FIG. 8 is a cross-sectional view illustrating a state in which, from the state in FIG. 7, the cover opening bag breaks a cover.
Figure 9:
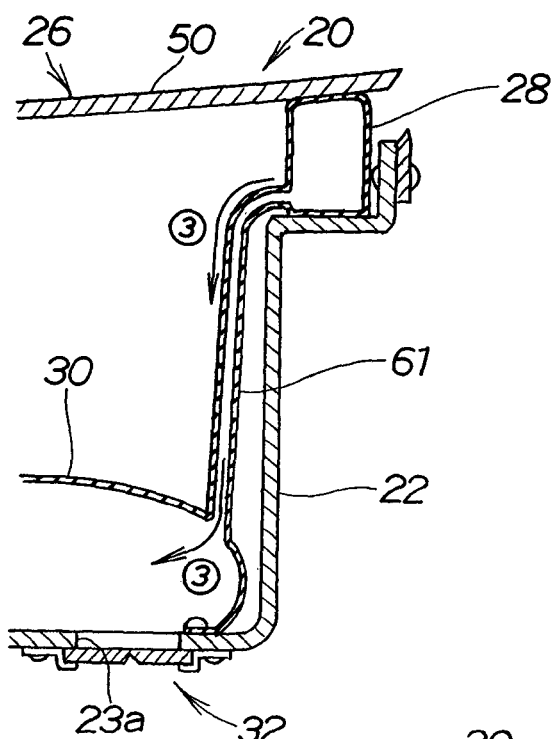
FIG. 9 is a cross-sectional view illustrating a state in which gas flows through the cover opening bag into the main airbag.

Gas continuously flows into the cover opening bag 28 after the full inflation of the cover opening bag 28, increasing the internal pressure of the cover opening bag 28 to a certain value P2 as shown in FIG. 8, and breaking the gas flow path temporarily closing portion 62 of the gas flow path 61.

The breakage of the gas flow path temporarily closing portion 62 allows communication between the space within the cover opening bag 28 and the space within the main airbag 30 via the gas flow path 61. Gas within the cover opening bag 28 flows through the gas flow path 61 into the main airbag 30 as shown by arrows ③.

Figure 10:
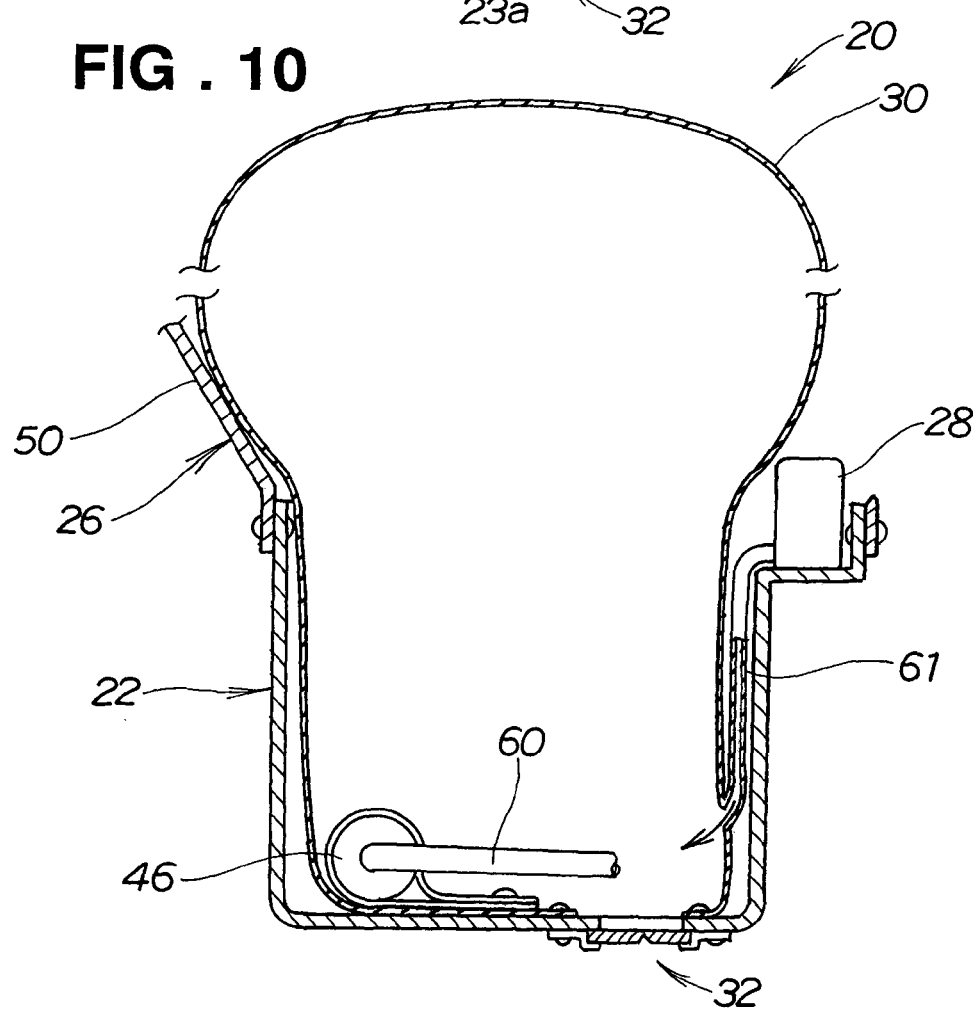
FIG. 10 is a cross-sectional view illustrating a state in which the main airbag is inflated.

As shown in FIG. 10, gas flows into the main airbag 30 as shown by an arrow, thereby inflating the main airbag 30. At that time, the cover 26 has already been opened by the cover opening bag 28. Nothing obstructs the inflation of the main airbag 30, causing the internal pressure of the main airbag 30 to increase to a release pressure P3 to open the bag pressure release mechanism 32.

Figure 11:
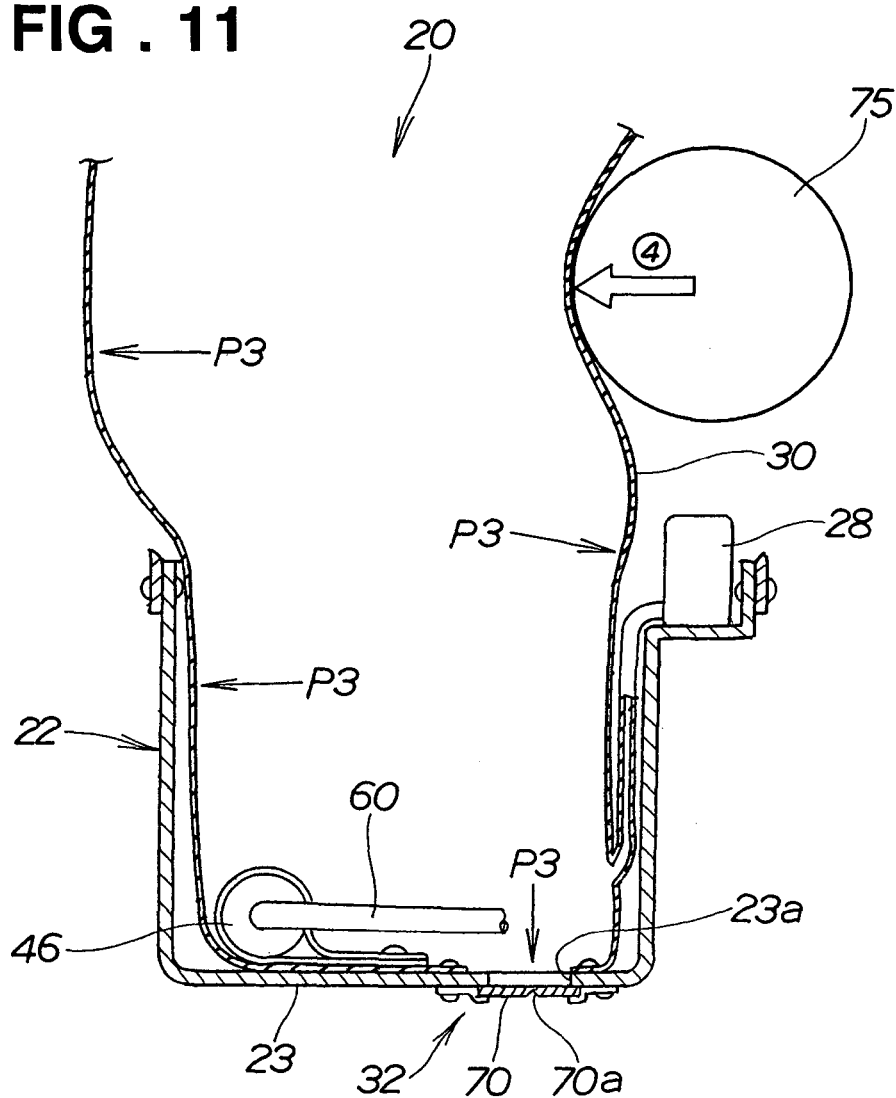
FIG. 11 is a cross-sectional view illustrating a state in which an obstacle collides with the inflated main airbag.

After the vehicle 10 shown in FIG. 1 collides with an obstacle 75, the obstacle 75 can secondarily collide with the main airbag 30 with a given time delay as shown in FIG. 11. The obstacle 75 presses the main airbag 30 as shown by arrow ④. Under the pressure, the internal pressure of the main airbag 30 increases to the release pressure P3. The release pressure P3 acts on the resin plate 70 of the bag pressure release mechanism 32.

Figure 12:
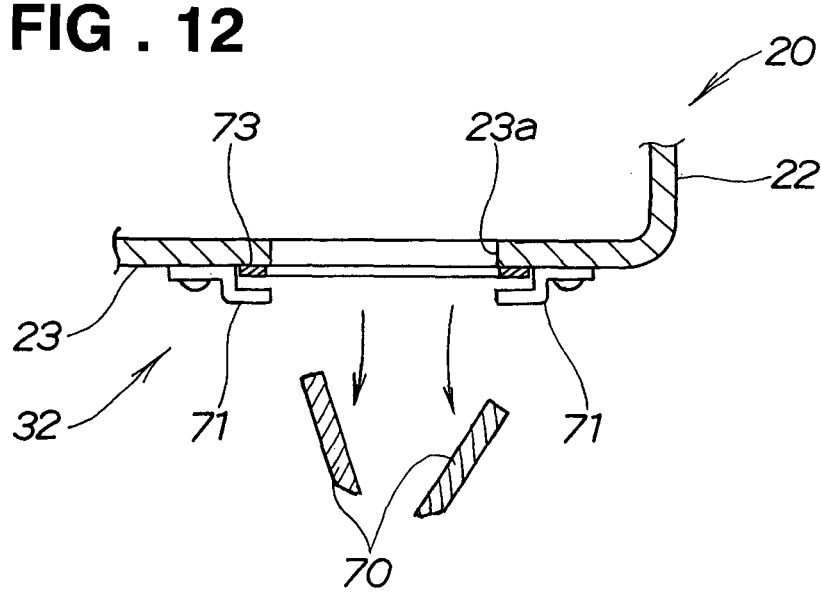
FIG. 12 is a cross-sectional view illustrating a state in which a resin plate of the bag pressure release mechanism is broken under a release pressure.

When the release pressure P3 formed in the main airbag 30 acts on the resin plate 70 of the bag pressure release mechanism 32, the resin plate 70 breaks at the notch 70a as shown in FIG. 12. The resin plate 70 is disengaged from the mounting brackets 71, 71, opening the vent hole 23a formed in the bottom 23 of the bag housing case 22.

Figure 13:
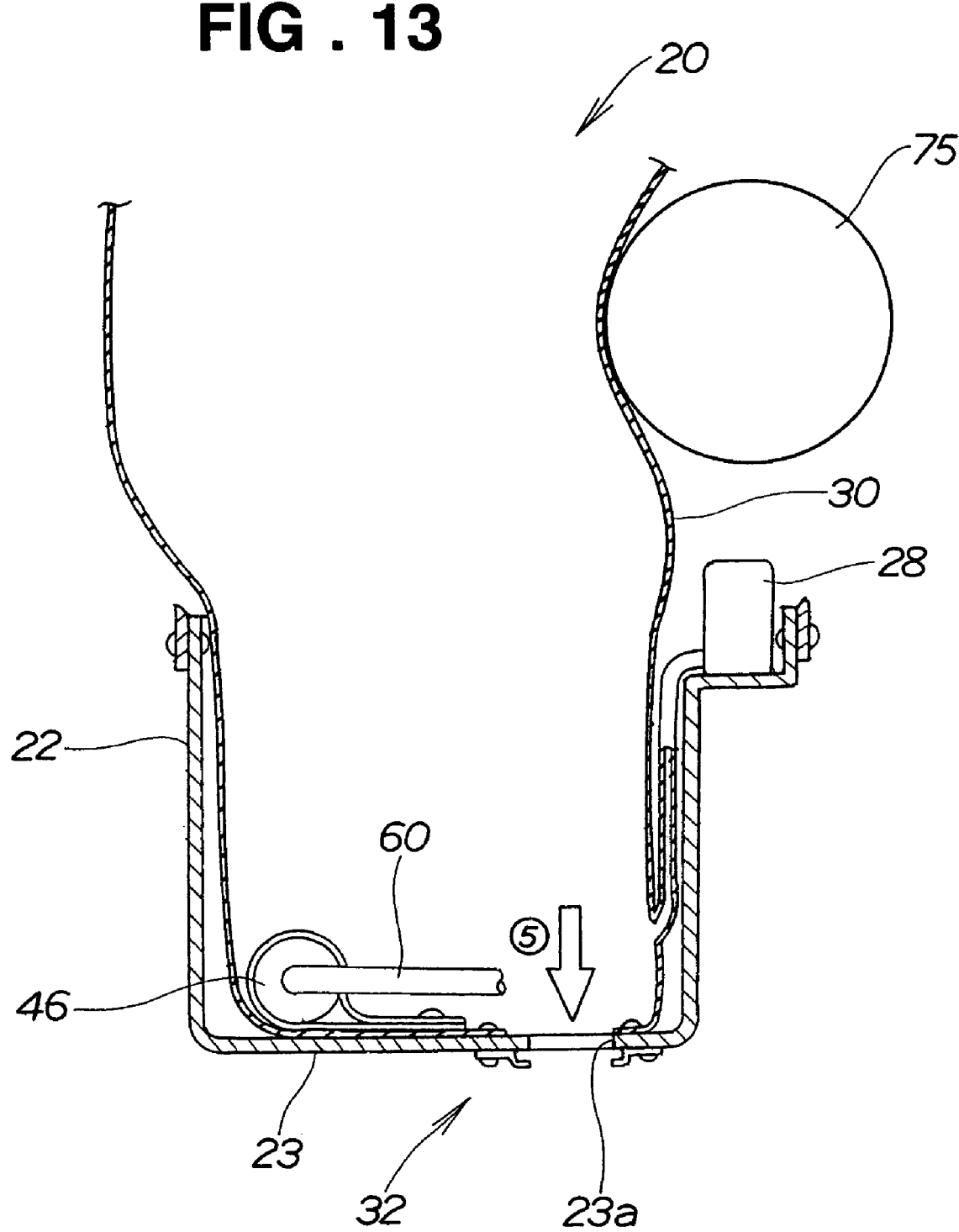
FIG. 13 is a cross-sectional view illustrating a state in which gas within the main airbag is discharged to the outside.

As shown in FIG. 13, with the opening of the vent hole 23a formed in the bottom 23 of the bag housing case 22, gas within the main airbag 30 is discharged to the outside through the vent hole 23a as shown by arrow ⑤. The discharge of the gas within the main airbag 30 to the outside through the vent hole 23a efficiently mitigates an impact on the obstacle 75.

With the airbag device 20 of the first embodiment, the cover 26 is opened without opening the bag pressure release mechanism 32, thereby to prevent the discharge of gas by closing the vent hole 23a with the bag pressure release mechanism 32 until the obstacle 75 collides with the main airbag 30.

In this manner, the releasing timing of the bag pressure release mechanism 32 can be delayed to reduce the amount of gas discharged through the vent hole 23a in the bag housing case 22. It is therefore possible to reduce the gas containing capacity of the inflator 46 to reduce the size of the inflator 46, and thereby to provide the airbag device 20 of a small size.

The simple structure having only two airbags of the cover opening bag 28 and the main airbag 30 permits the bag pressure release mechanism 32 to be opened only when needed. An internal pressure sensor, control valve and controller which have conventionally been required can thus be eliminated, resulting in the airbag device 20 of a simple structure.

Figure 14:
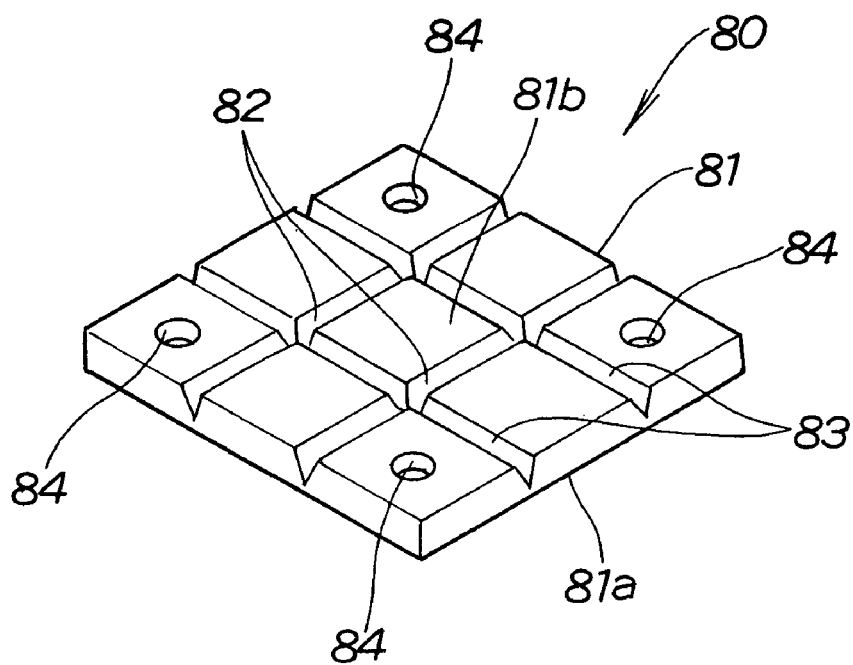
FIG. 14 is a perspective view illustrating another example of the resin plate in the bag pressure release mechanism for use in the airbag device in the first embodiment.

FIG. 14 illustrates another example of the bag pressure release mechanism 32 described in the first embodiment.

A bag pressure release mechanism 80 of another example shown in FIG. 14 is a member replaceable with the bag pressure release mechanism 32 described in the first embodiment. The bag pressure release mechanism 80 has a rectangular resin plate 81 formed in its surface with a pair of parallel notches 82, 82 and a pair of parallel notches 83, 83 orthogonal to the pair of notches 82, 82, and also formed in its four corners with mounting holes 84.

A release pressure P3 of the bag pressure release mechanism 80 (see FIG. 11) is determined by the material of the resin plate 81, the number of notches, the depth of notches, and the length of notches (or the diameter of the vent hole 23a). In other words, the release pressure P3 of the bag pressure release mechanism 80 is adjustable by changing the material of the resin plate 81, the number of notches, the depth of notches, and the length of notches.

In the bag pressure release mechanism 80 in the above example, with a rear surface 81a of the resin plate 81 opposed to the vent hole 23a (shown in FIG. 6), screws are inserted into the mounting holes 84 formed in the four corners of the resin plate 81, and the inserted screws are screwed to the bottom 23 of the bag housing case 22 (see FIG. 6), whereby the resin plate 81 closes the vent hole 23a.

When the internal pressure of the main airbag 30 (see FIG. 10) increases to a predetermined value, the predetermined pressure acts on the resin plate 81 of the bag pressure release mechanism 80, causing the resin plate 81 to brake at the notches 82, 82 and 83, 83. The breakage of the resin plate 81 causes a central portion 81b of the resin plate 81 to be cut off from the resin plate 81, opening the vent hole 23a. Gas is discharged through the open vent hole 23a.

The bag pressure release mechanism 80 in the above example provides the same effects as the bag pressure release mechanism 32 used in the first embodiment.

Moreover, having the increased number of notches 82, 82 and 83, 83, the bag pressure release mechanism 80 further facilitates the adjustment of the release pressure P3.

Although the bag pressure release mechanism 80 has been described with the example of screwing the resin plate 81 to the bottom 23 of the bag housing case 22, it is also possible to mount the resin plate 81 to the bottom 23 of the bag housing case 22 with presser brackets 71, 71 (see FIG. 6) as in the first embodiment.

Figure 15:
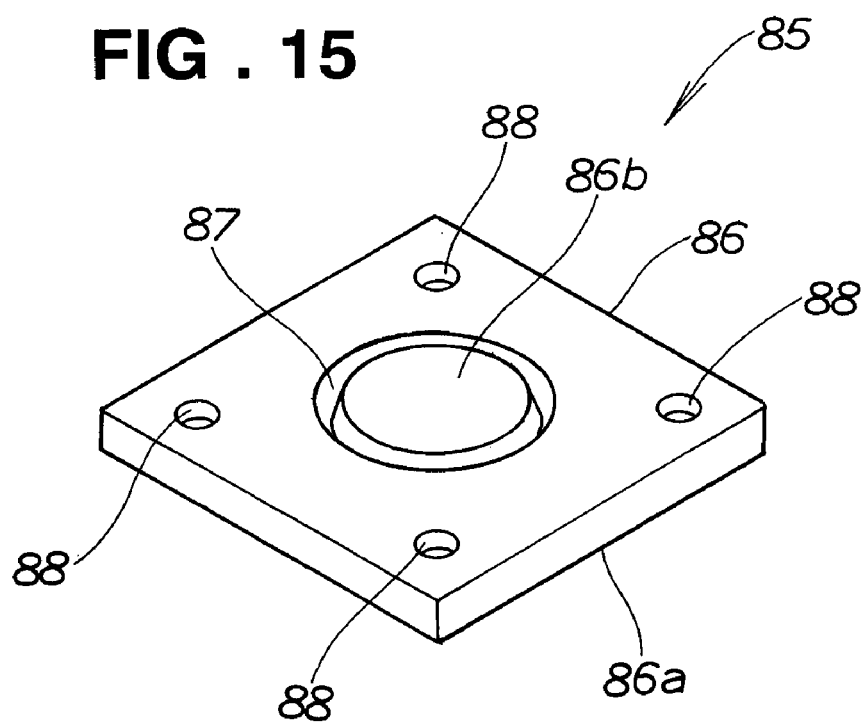
FIG. 15 is a perspective view illustrating still another example of the resin plate shown in FIG. 14.

FIG. 15 illustrates a bag pressure release mechanism 85 according to still another example.

The bag pressure release mechanism 85 is replaceable with the bag pressure release mechanism 32 in the first embodiment. The bag pressure release mechanism 85 has a rectangular resin plate 86 formed in its surface with a circular notch 87 and formed in its four corners with mounting holes 88.

A release pressure P3 of the bag pressure release mechanism 85 is determined by the material of the resin plate 86 and the notch depth like the bag pressure release mechanism 80 in the example shown in FIG. 14. The release pressure P3 of the bag pressure release mechanism 85 is adjusted by changing the material of the resin plate 86 and the notch depth.

In the bag pressure release mechanism 85 shown in FIG. 15, with a rear surface 86a of the resin plate 86 opposed to the vent hole 23a (shown in FIG. 6), screws are inserted into the mounting holes 88 formed in the four corners of the resin plate 86 and the inserted screws are screwed to the bottom 23 of the bag housing case 22 (see FIG. 6), whereby the resin plate 86 closes the vent hole 23a.

When the internal pressure of the main airbag 30 (see FIG. 11) increases to a predetermined value, the predetermined pressure acts on the resin plate 86 of the bag pressure release mechanism 85, causing the resin plate 86 to break at the notch 87. The breakage causes a central portion 86b of the resin plate 86 to be cut off from the resin plate 86, opening the vent hole 23a. Gas is discharged through the open vent hole 23a.

The bag pressure release mechanism 85 in the above example provides the same effects as the bag pressure release mechanism 32 in the first embodiment.

Although the bag pressure release mechanism 85 in the example shown in FIG. 15 has been described with the example of screwing the resin plate 86 to the bottom 23 of the bag housing case 22, it is also possible to mount the resin plate 86 to the bottom 23 of the bag housing case 22 with presser brackets 71, 71 (see FIG. 6) as in the first embodiment.

Figure 16:
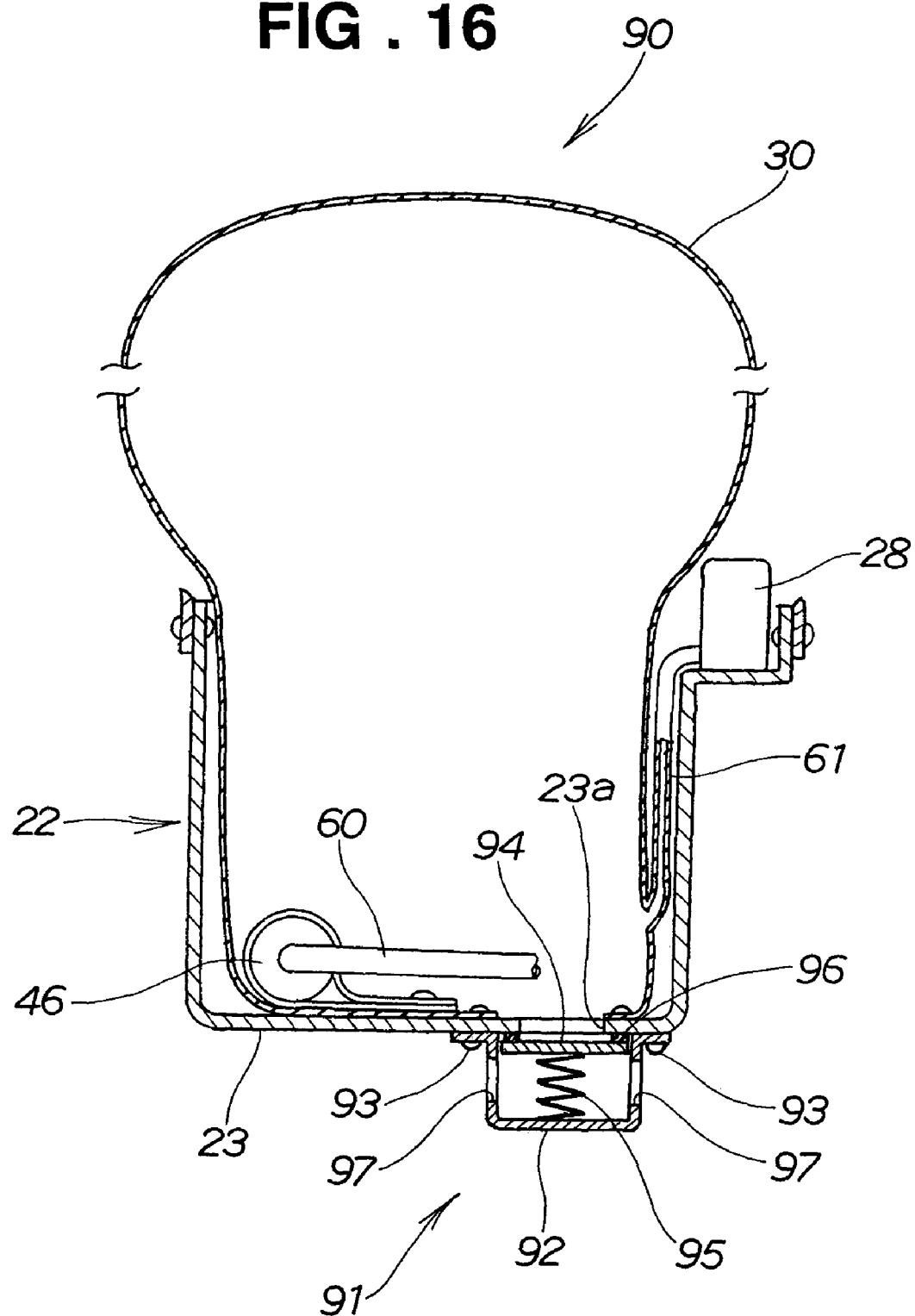
FIGS. 16 and 17 are cross-sectional views illustrating the structure and operation of an airbag device according to a second embodiment of the present invention.
Figure 17:
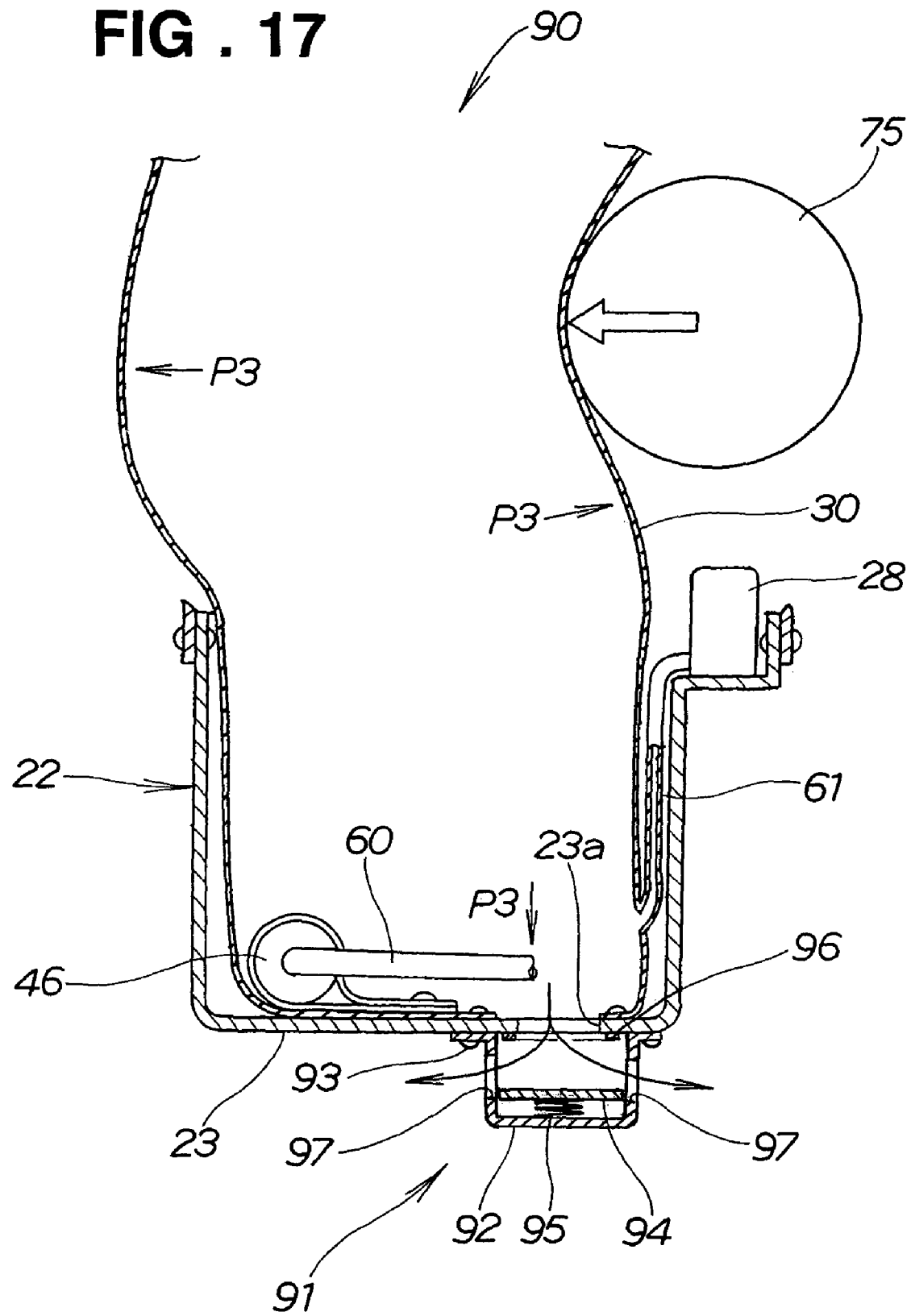

FIGS. 16 and 17 illustrate an airbag device 90 according to a second embodiment.

A bag pressure release mechanism 91 of the airbag device 90 in the second embodiment has a cap 92 secured to the bottom 23 of a bag housing case 22 with screws 93, 93, and a valve plate 94 disposed in the cap 92, being biased to the bottom 23 by a spring 95, thereby closing a vent hole 23a with the valve plate 94.

A sealing member 96 is disposed between the bottom 23 and the valve plate 94 to seal the gap between the bottom 23 and the valve plate 94. When a main airbag 30 inflates, the sealing prevents gas from being discharged through the vent hole 23a as in the first embodiment.

Now, an operation of the airbag device 90 in the second embodiment will be described with reference to FIG. 17.

As shown in FIG. 17, if an obstacle 75 secondarily collides with the main airbag 30, the main airbag 30 is pressed by the obstacle 75 as shown by an arrow. The internal pressure of the main airbag 30 increases to a release pressure P3 and the release pressure P3 acts on the valve plate 94 of the bag pressure release mechanism 91. The valve plate 94 is pushed downward against the spring force of the spring 95, opening the vent hole 23a formed in the bottom 23 of the bag housing case 22.

With the opening of the vent hole 23, gas within the main airbag 30 escapes through the vent hole 23a into the cap 92. The gas within the cap 92 is discharged outside through outlets 97, 97 as shown by arrows.

The release of gas within the main airbag 30 efficiently mitigates an impact on the obstacle 75.

The airbag device 90 in the second embodiment provides the same functions and effects as the airbag device 20 in the first embodiment. The release pressure P3 can be easily adjusted by changing the spring constant of the spring 95.

Although the airbag device 90 in the second embodiment has been described with the example of closing the vent hole 23a using the spring 95, it is also possible to use a member of a honeycomb structure in place of the spring 95. Specifically, the valve plate 94 is usually pressed against the bottom 23 by the honeycomb member to close the vent hole 23a with the valve plate 94, and the vent hole 23a is opened by buckling-deforming the honeycomb member under the release pressure P3.

Figure 18:
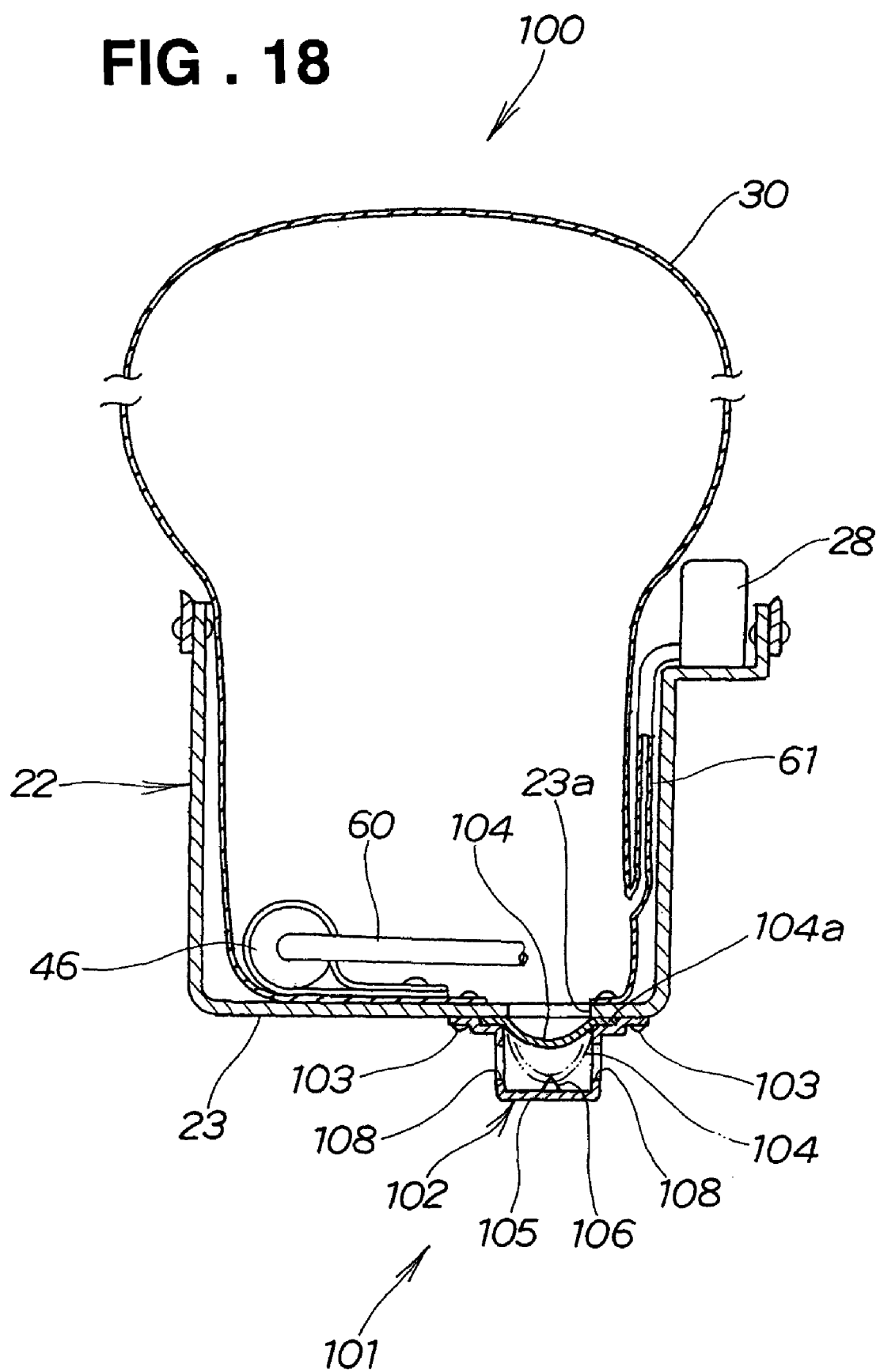
FIGS. 18 and 19 are cross-sectional views illustrating the structure and operation of an airbag device according to a third embodiment of the present invention.
Figure 19:
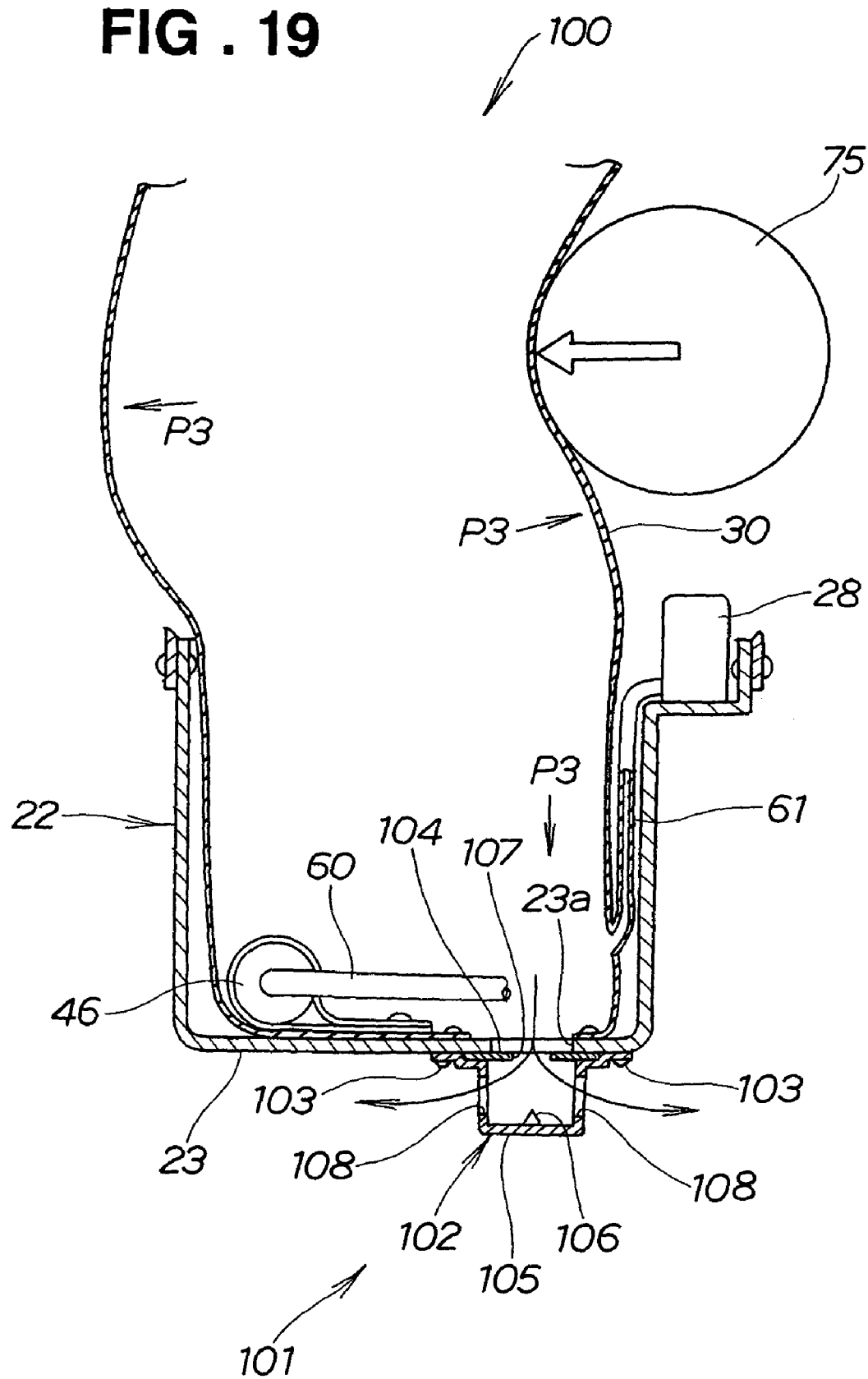

FIGS. 18 and 19 illustrate an airbag device 100 in a third embodiment.

A bag pressure release mechanism 101 of the airbag device 100 of the third embodiment has a cap 102 secured to the bottom 23 of a bag housing case 22 with screws 103, 103, and a rubber plug 104 with a peripheral portion 104a interposed between the bottom 23 of the bag housing case 22 and the cap 102, thereby closing a vent hole 23a with the rubber plug 104. The rubber plug 104 is a resiliently deformable rubber member of a shape with a central portion curved downward. When a main airbag 30 inflates, gas is prevented from being discharged through the vent hole 23a as in the airbag device 20 in the first embodiment.

With the bag pressure release mechanism 101, if an obstacle 75 secondarily collides with the main airbag 30 as shown in FIG. 19, the main airbag 30 is pressed by the obstacle 75 and the internal pressure of the main airbag 30 increases to a release pressure P3. The release pressure P3 acts on the rubber plug 104 of the bag pressure release mechanism 101. The central portion of the rubber plug 104 is resiliently deformed as shown by imaginary lines in FIG. 18 to contact a piercing needle 106 provided on the bottom 105 of the cap 102. The rubber plug 104 contacting the piercing needle 106 is broken.

A pierced portion 107 is formed in the center of the rubber plug 104 as shown in FIG. 19 by breaking the center of the rubber plug 104, opening the vent hole 23a of the bag housing case 22. Gas within the main airbag 30 escapes through the vent hole 23a into the cap 102. The gas within the cap 102 is discharged outside through outlets 108, 108 as shown by arrows.

The release of gas within the main airbag 30 efficiently mitigates an impact on the obstacle 75.

The airbag device 100 provides the same effects as the airbag device 20 in the first embodiment. The pierced portion 107 can be formed by breaking the center of the rubber plug 104, which eliminates the need for continuously pushing down the valve plate 94 against the spring force of the spring 95 as in the second embodiment shown in FIGS. 16 and 17, resulting in a more efficient discharge of gas within the main airbag 30.

Although the third embodiment has been described with the example of providing the piercing needle 106 on the bottom 105 of the cap 102 and making the center of the rubber plug 104 contact the piercing needle 106 to open the rubber plug 104, it is also possible to press the center of the rubber plug 104 against the bottom 105 of the cap 102 without the piercing needle 106 provided on the bottom 105 of the cap 102, to break the rubber plug 104.

Figure 20:
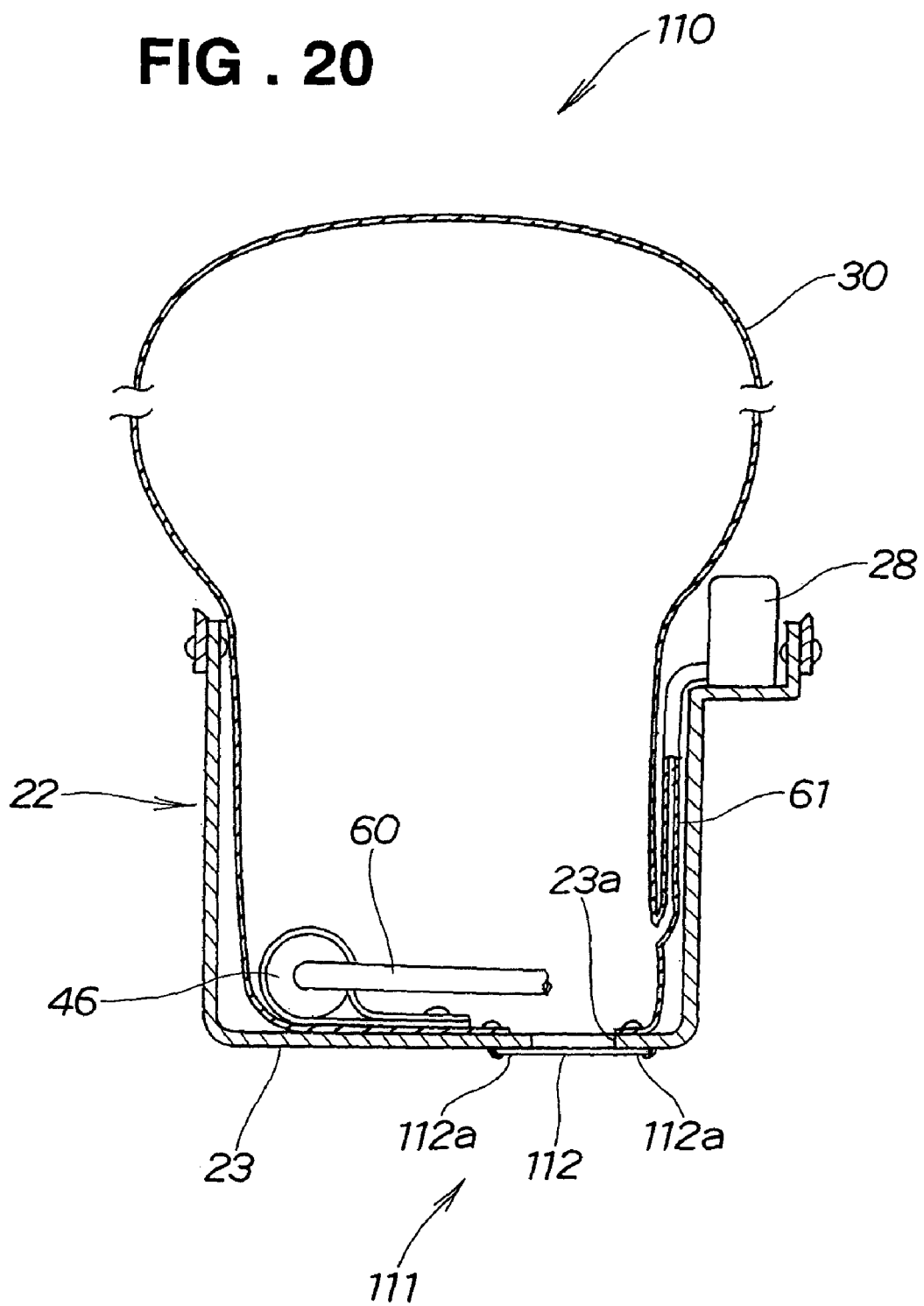
FIGS. 20 and 21 are cross-sectional views illustrating the structure and operation of an airbag device according to a fourth embodiment of the present invention.
Figure 21:
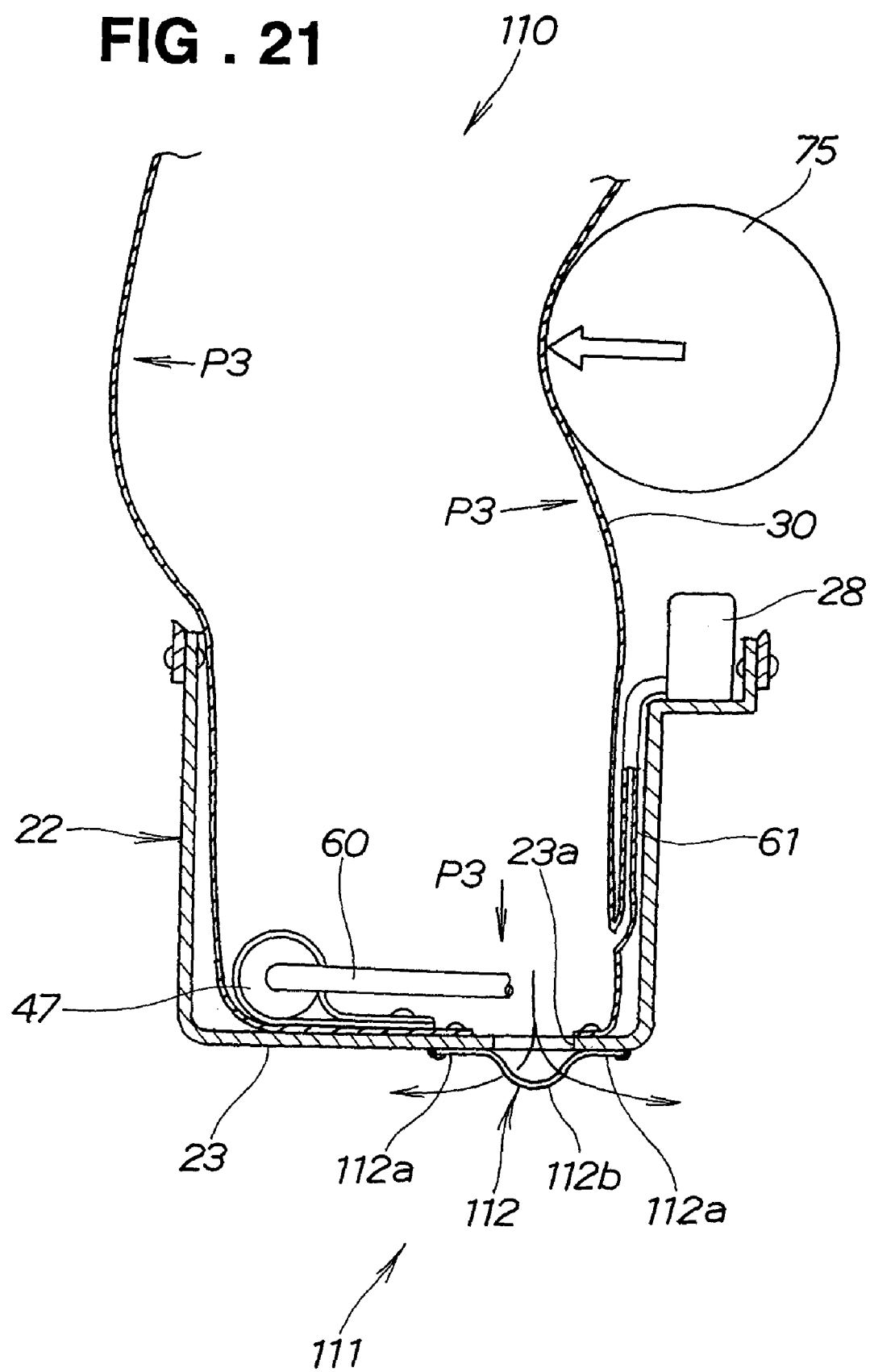

FIGS. 20 and 21 illustrate an airbag device 110 according to a fourth embodiment.

A bag pressure release mechanism 111 in the airbag device 110 in the fourth embodiment has a thin plate 112 opposed to a vent hole 23a formed in the bottom 23 of a bag housing case 22 so that the thin plate 112 closes the vent hole 23a.

The thin plate 112 is formed in a substantially rectangular shape and has opposite ends 112a, 112a as two edges of its four edges, welded to the bottom 23 to close the vent hole 23a. The thin plate 112 is pressure-adapted not to be deformed when the internal pressure of a main airbag 30 reaches a predetermined pressure P2 but to be plastically deformed under a release pressure P3 shown in FIG. 21 as described in the first embodiment in FIG. 8. When the main airbag 30 inflates, gas is thus prevented from being discharged through the vent hole 23a as in the first embodiment.

As shown in FIG. 21, if an obstacle 75 secondarily collides with the main airbag 30, the main airbag 30 is pressed by the obstacle 75 as shown by an arrow. The internal pressure of the main airbag 30 increases to the release pressure P3 and the release pressure P3 acts on the thin plate 112 of the bag pressure release mechanism 111. Under the release pressure P3, a central portion 112b of the thin plate 112 is plastically deformed into a downward curve. The plastic deformation causes the central portion 112b of the thin plate 112 to be detached from the bottom 23 of the bag housing case 22, opening the vent hole 23a formed in the bottom 23.

The opening of the vent hole 23a causes gas within the main airbag 30 to escape outside through the vent hole 23a as shown by arrows.

The release of gas within the main airbag 30 efficiently mitigates an impact on the obstacle 75.

In the airbag device 110 in the fourth embodiment, the thin plate 112 is plastically deformed to open the vent hole 23a. Once the vent hole 23a is opened, the vent hole 23a can never be closed. Gas within the main airbag 30 is thus efficiently discharged.

Figure 22:
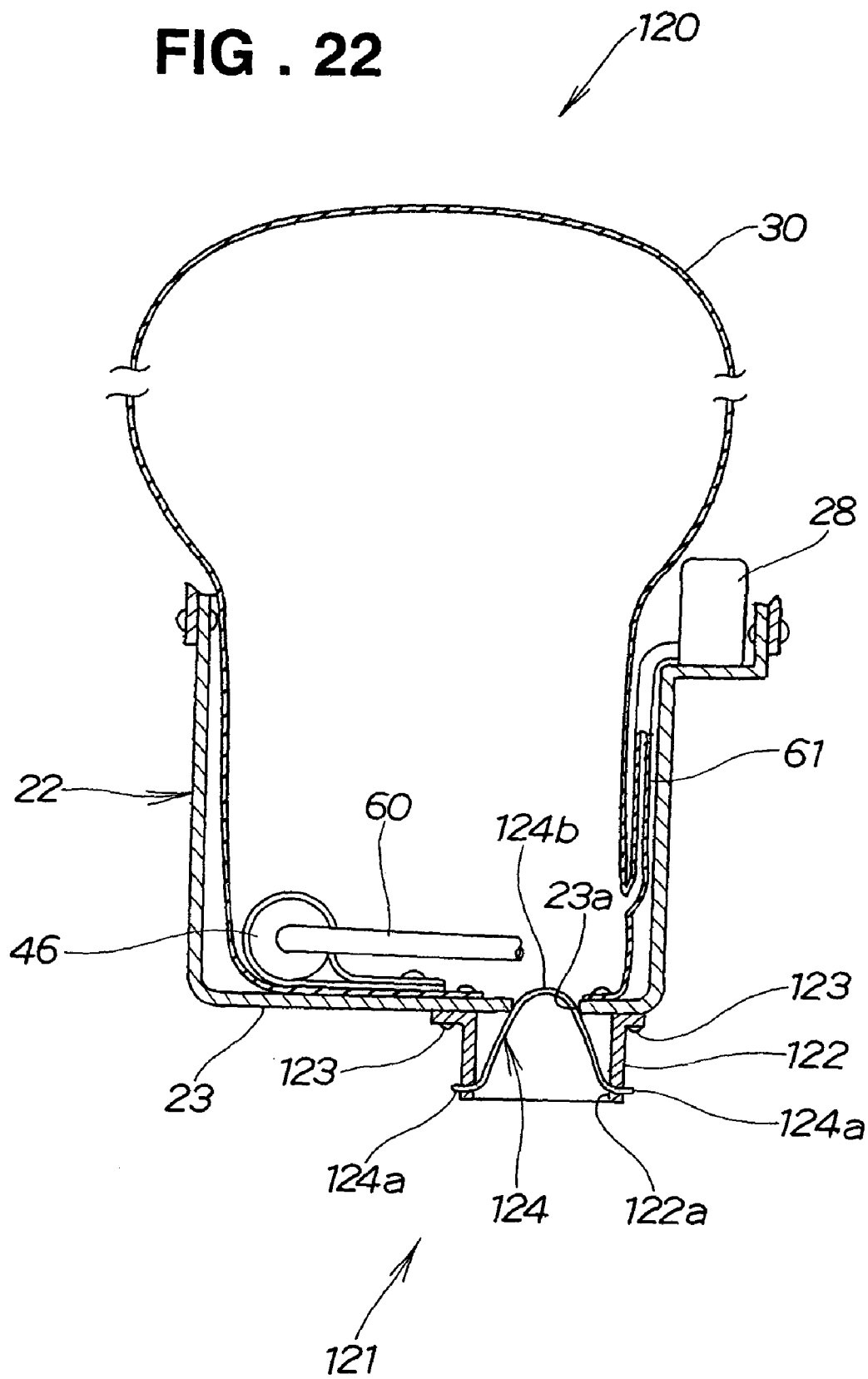
FIGS. 22 and 23 are cross-sectional views illustrating the structure and operation of an airbag device according to a fifth embodiment of the present invention.
Figure 23:
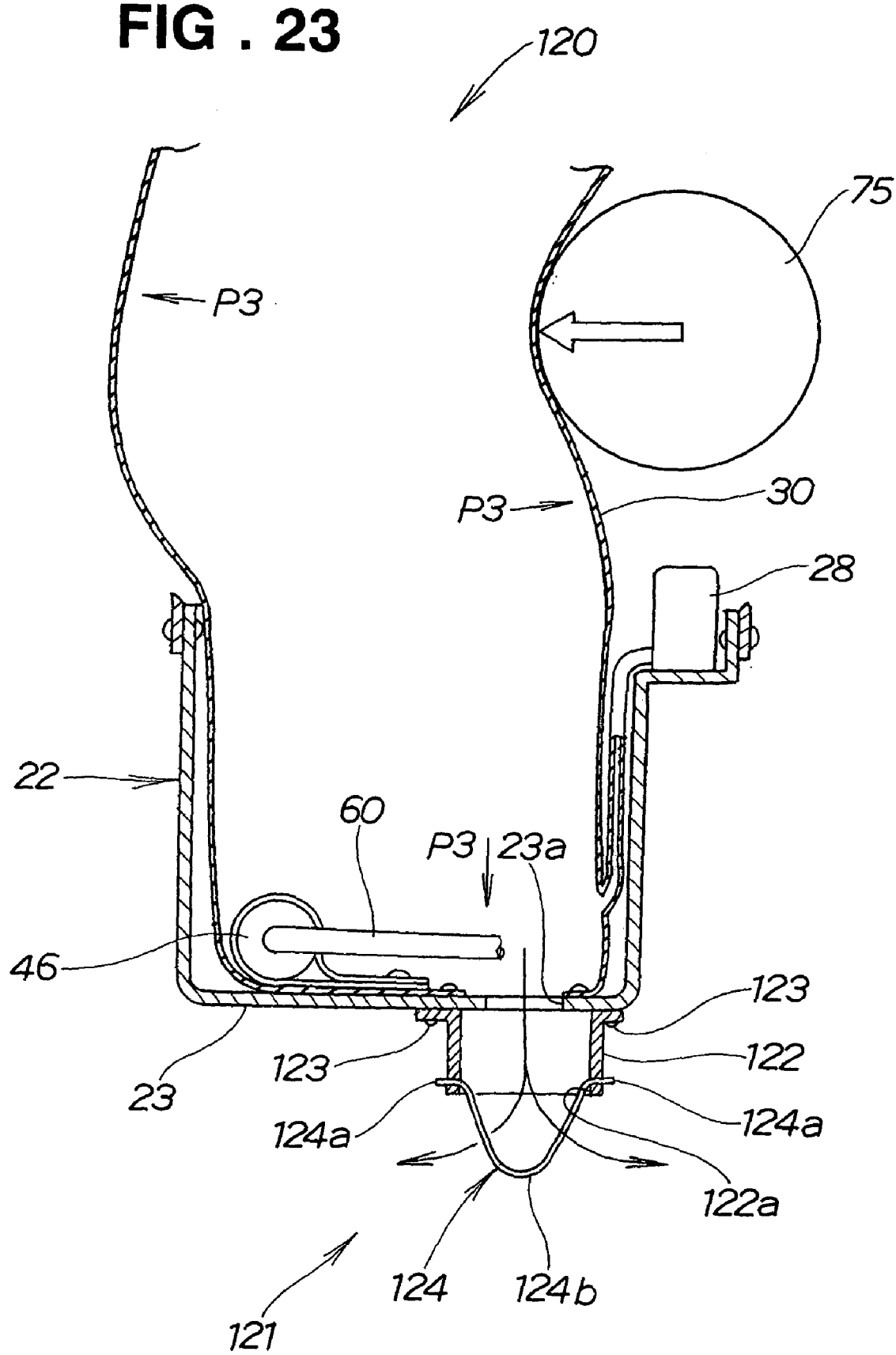

FIGS. 22 and 23 illustrate an airbag device 120 according to a fifth embodiment of the present invention.

A bag pressure release mechanism 121 in the airbag device 120 of the fifth embodiment has a rectangular hollow body 122 secured to the bottom 23 of a bag housing case 22 with screws 123, 123 and a plate spring 124 with opposite ends 124a, 124a secured in the vicinities of a distal end opening 122a of the rectangular hollow body 122 and with a central portion 124b resiliently deformed into an upward curve, thereby closing a vent hole 23a with the central portion 124b. The vent hole 23a is formed in a rectangular shape so as to be efficiently closed by the plate spring 124. When the main airbag 30 inflates, gas is prevented from being discharged through the vent hole 23a as in the first embodiment.

As shown in FIG. 23, if an obstacle 75 secondarily collides with the main airbag 30, the main airbag 30 is pressed by the obstacle 75 as shown by an arrow. The internal pressure of the main airbag 30 increases to a release pressure P3. The release pressure P3 acts on the central portion 124b of the plate spring 124 of the bag pressure release mechanism 121 (the plate spring 124 in the state in FIG. 22). Under the release pressure P3, the plate spring 124 is pushed downward against the spring force, being resiliently deformed into a downward curve. The central portion 124b of the plate spring 124 is detached from the bottom 23 of the bag housing case 22, opening the vent hole 23a formed in the bottom 23.

The opening of the vent hole 23a causes gas within the main airbag 30 to escape through the vent hole 23a into the rectangular hollow body 122. The gas within the rectangular hollow body 122 escapes outside through the distal end opening 122a as shown by arrows.

The release of gas within the main airbag 30 efficiently mitigates an impact on the obstacle 75.

The airbag device 120 in the fifth embodiment has the same effects as the airbag device 20 in the first embodiment. In the airbag device 120 in the fifth embodiment, the plate spring 124 is resiliently deformed from an upward curved shape into a downward curved shape to open the vent hole 23a. Once the vent hole 23a is opened, the vent hole 23a can never be closed. Gas within the main airbag 30 can thus be more efficiently discharged.

Figure 24:
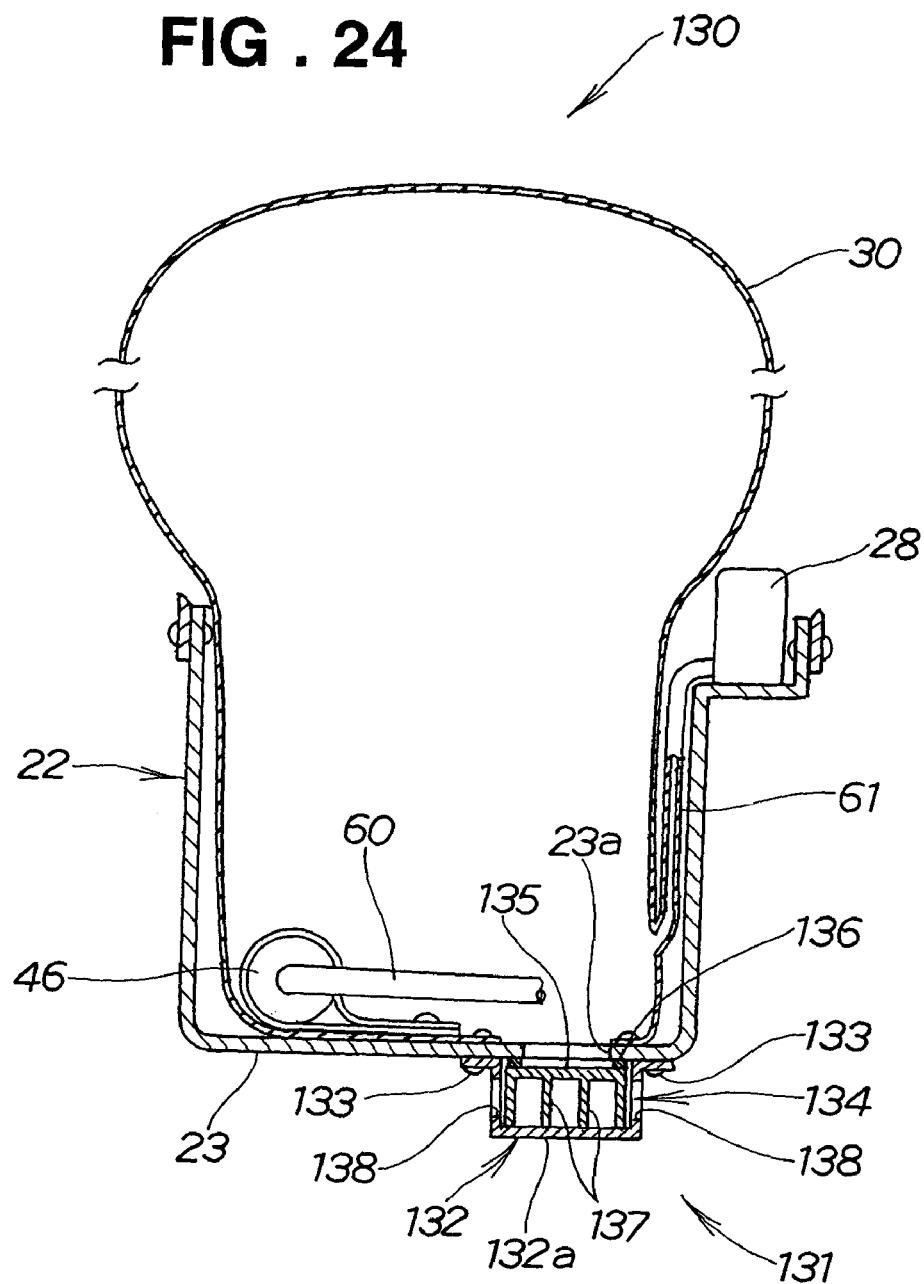
FIG. 24 is a cross-sectional view illustrating an airbag device according to a sixth embodiment of the present invention.
Figure 25:
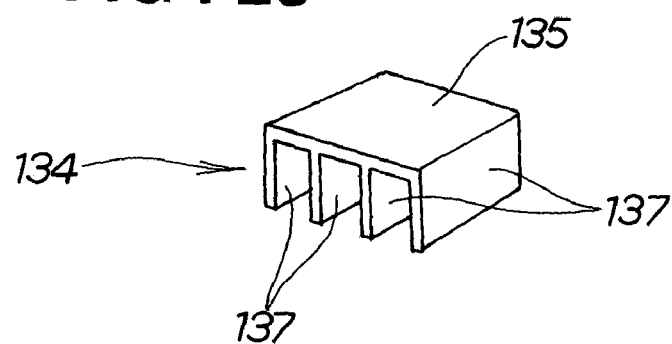
FIG. 25 is a perspective view of a plug member as a component of a bag pressure release mechanism shown in FIG. 24.
Figure 26:
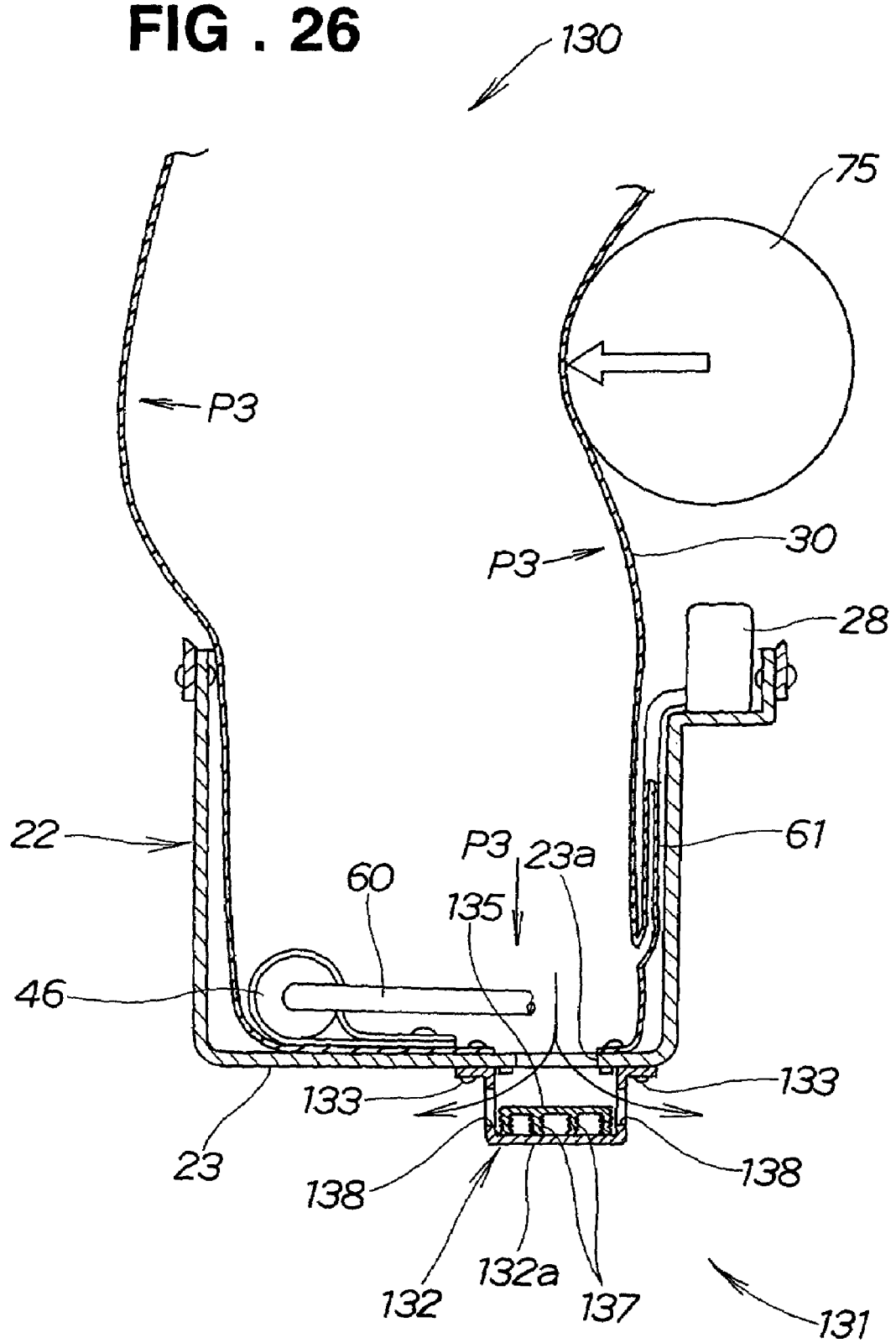
FIG. 26 is a cross-sectional view illustrating an operation of the airbag device in the sixth embodiment shown in FIG. 24.

FIGS. 24, 25 and 26 illustrate an airbag device 130 according to a sixth embodiment of the present invention.

A bag pressure release mechanism 131 in the airbag device 130 of the sixth embodiment has a cap 132 secured to the bottom 23 of a bag housing case 22 with screws 133, 133, and a plug member 134 disposed in the cap 132, being placed on the bottom 132a of the cap 132 so that an upper plate 135 of the plug member 134 is pressed against the bottom 23 via a sealing member 136 to close the vent hole 23a with the upper plate 135. When a main airbag 30 inflates, gas is prevented from being discharged through the vent hole 23a as in the airbag device 20 in the first embodiment.

As shown in FIG. 25, the plug member 134 has four ribs 137 extending downward from the upper plate 135 at regular intervals. The plug member 134 is made from resin (such as propylene (PP)). The height of the four ribs 137 is determined so that the upper plate 135 abuts on the bottom 23 of the bag housing case 22 when the plug member 134 is placed on the bottom 132a of the cap 132 shown in FIG. 24.

As shown in FIG. 26, if an obstacle 75 secondarily collides with the main airbag 30, the main airbag 30 is pressed by the obstacle 75 as shown by an arrow, and the internal pressure of the main airbag 30 increases to a release pressure P3. The release pressure P3 acts on the upper plate 135 of the bag pressure release mechanism 131. The release pressure P3 buckling-deforms the four ribs 137 extending downward from the upper plate 135, pressing the upper plate 135 downward. The vent hole 23a formed in the bottom 23 of the bag housing case 22 is opened.

The opening of the vent hole 23a causes gas within the main airbag 30 to escape through the vent hole 23a into the cap 132. The gas within the cap 132 escapes outside through outlets 138, 138 as shown by arrows.

The release of gas within the main airbag 30 efficiently mitigates an impact on the obstacle 75.

The airbag device 130 in the sixth embodiment has the same effects as the airbag device 20 in the first embodiment. With the airbag device 130, the release pressure P3 can be easily adjusted by changing the plate thickness or the number of the four ribs 137.

Figure 27:
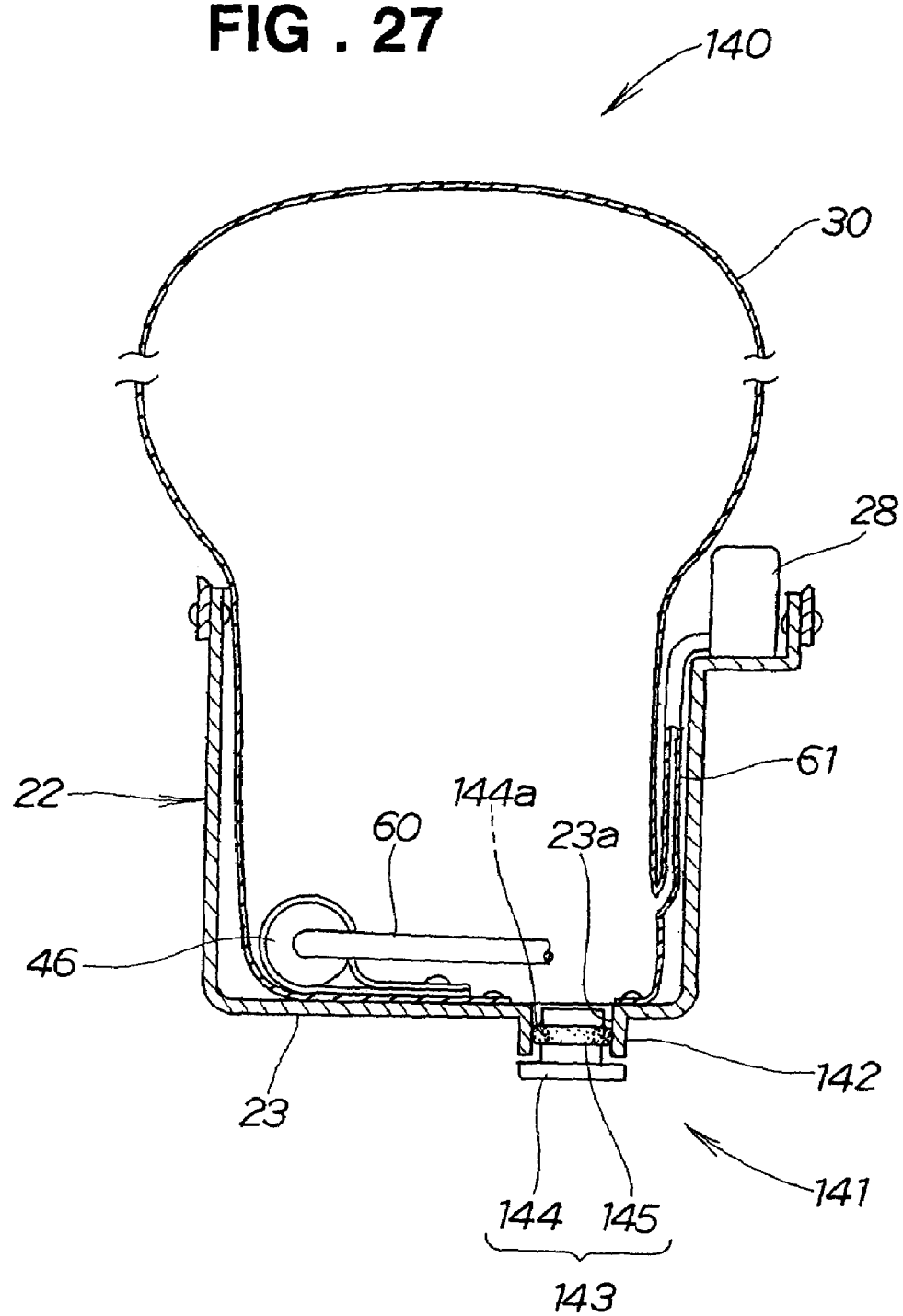
FIGS. 27 and 28 are cross-sectional views illustrating the structure and operation of an airbag device according to a seventh embodiment of the present invention.
Figure 28:
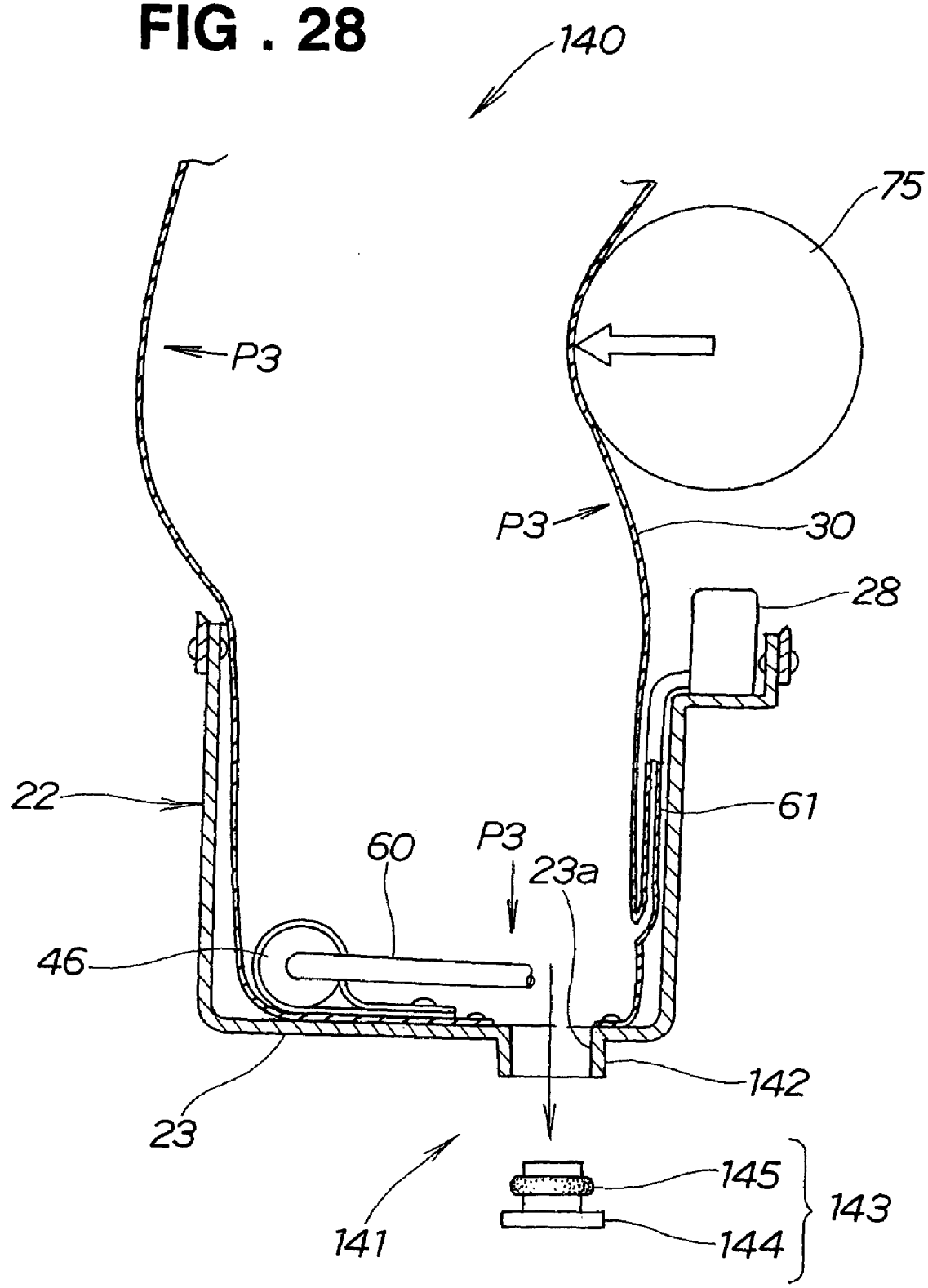

FIGS. 27 and 28 illustrate an airbag device 140 according to a seventh embodiment of the present invention.

A bag pressure release mechanism 141 in the airbag device 140 of the seventh embodiment has a tubular outlet 142 formed at the bottom 23 of a bag housing case 22, being protruded downward, and a plug member 143 inserted into a vent hole 23a of the outlet 142 to close the vent hole 23a.

The plug member 143 has a plug body 144 formed with a ling groove 144a around the outer periphery, and an O-ring 145 fitted onto the ring groove 144a. When the plug member 143 is inserted into the vent hole 23a, the O-ring 145 closes the gap between the plug body 144 and the vent hole 23a. When a main airbag 30 inflates, gas is thus prevented from being discharged through the vent hole 23a as in the first embodiment. A release pressure P3 shown in FIG. 28 is properly adjustable by changing the frictional force between the O-ring 145 and the vent hole 23a.

As shown in FIG. 28, if an obstacle 75 secondarily collides with the main airbag 30, the main airbag 30 is pressed by the obstacle 75 as shown by an arrow. The internal pressure of the main airbag 30 increases to the release pressure P3. The release pressure P3 acts on the plug member 143 of the bag pressure release mechanism 141. Under the release pressure P3, the plug member 143 is pressed downward and removed from the vent hole 23a formed in the bottom 23 of the bag housing case 22. The vent hole 23a is thus opened, allowing gas within the main airbag 30 to escape outside through the vent hole 23a as shown by an arrow.

The release of gas within the main airbag 30 efficiently mitigates an impact on the obstacle 75.

The airbag device 140 in the seventh embodiment has the same effects as the airbag device 20 in the first embodiment. In the airbag device 140, the vent hole 23a in the bag housing case 22 can be closed only by inserting the plug member 143 into the vent hole 23a, resulting in simplification of the bag pressure release mechanism 141 and reduced restrictions on mounting space for mounting the bag pressure release mechanism 141.

The first to seventh embodiments have been described with the examples of airbag devices each having the main airbag 30 to be inflated over the windshield 13. The present invention is not limited to the airbag devices and may also be used for an airbag device with the main airbag 30 to be inflated over an A-pillar, for example.

Obviously, various minor changes and modifications of the present invention are possible in the light of the above teaching. It is therefore to be understood that without departing from the scope of the appended claims, the invention may be practices otherwise than as specifically described.

What is claimed is:

1. An airbag device for a vehicle comprising:
   a bag housing case adapted to be disposed below a rear end of a bonnet in proximity to a bottom portion of a windshield of the vehicle, the bag housing case having an opening and a cover mounted to close the opening, the bag housing case further having defined therein a main housing space and a sub-housing space separated from the main housing space and located adjacent to the cover at one side of the bag housing case;
   a first airbag housed in a deflated, folded state within the sub-housing space of the bag housing case, for opening the cover of the bag housing case from the one side thereof by an inflating force of the first airbag when inflating;
   a second airbag housed in a deflated, folded state within the main housing space of the bag housing case, for mitigating an impact on an obstacle by inflation after the cover is opened;
   a bag pressure release mechanism for opening the inflated second airbag when an internal pressure of the second airbag reaches a predetermined pressure so as to release gas within the second airbag to the outside;
   an inflator disposed within the second airbag;
   a gas supply pipe communicating at a first end with the inflator and at a second end with a first end of the first airbag;
   a gas flow path communicating at a first end with a second end of the first airbag and at a second end with the second airbag; and
   a gas flow path temporarily closing portion disposed in an intermediate portion of the gas flow path for temporarily closing the gas flow path, the gas flow path temporarily closing portion being broken under internal pressure of the first airbag, when the internal pressure of the first airbag reaches a predetermined value, allowing gas within the first airbag to flow through the gas flow path into the second airbag.

2. The airbag device as set forth in claim 1, wherein said bag housing case includes a vent hole in communication with an internal space of the second airbag, and said bag pressure relief mechanism has a closure member normally covering said vent hole to close the same, said closure member allowing high pressure gas to escape from the second airbag through said vent hole when the second airbag is struck by the obstacle with such an impact as to cause the internal pressure of the second airbag to increase up to the predetermined pressure, thereby reducing the impact forces on said obstacle.

3. The airbag device as set forth in claim 2, wherein said closure member of the bag pressure relief mechanism comprises a scored plate which fractures when the internal pressure of the second airbag exceeds said predetermined pressure thereby allowing said gas to discharge through said vent hole.

4. The airbag device as set forth in claim 2, wherein said closure member of the bag pressure relief mechanism comprises a plate member biased against a seal by an elastic member, said plate member deflecting off said seal when the internal pressure of the second airbag exceeds said predetermined pressure thereby allowing the gas to discharge through said vent hole.

5. The airbag device as set forth in claim 2, wherein said closure member of the bag pressure relief mechanism comprises an elastomeric material covering said vent hole which expands outwardly against an opposing piercing member and bursts open when the internal pressure of the second airbag exceeds said predetermined pressure thereby allowing the gas to discharge through said vent hole.

6. The airbag device as set forth in claim 2, wherein said closure member of the bag pressure relief mechanism comprises a thin plate welded to said bag housing over said vent hole which plastically deforms and detaches from said housing when the internal pressure of the second airbag exceeds said predetermined pressure thereby allowing the gas to discharge through said vent hole.

7. The airbag device as set forth in claim 2, wherein said closure member of the bag pressure relief mechanism comprises a plate spring biased against said vent hole which becomes elastically inverted away from said vent hole when the internal pressure of the second airbag exceeds said predetermined pressure thereby allowing the gas to discharge through said vent hole.

8. The airbag device as set forth in claim 2, wherein said closure member of the bag pressure relief mechanism comprises a ribbed plug member biased against said vent hole, said vent hole having ribs which buckle when the internal pressure of the second airbag exceeds said predetermined pressure thereby allowing the gas to discharge through said vent hole.

9. The airbag device as set forth in claim 2, wherein said closure member of the bag pressure relief mechanism comprises a plug member having an annular seal inserted into the vent hole, said plug member being ejected from said vent hole when the internal pressure of the second airbag exceeds said predetermined pressure thereby allowing the gas to discharge through said vent hole.

10. The airbag device as set forth in claim 1, wherein said bag housing case includes means for relieving pressure from the second airbag when said second airbag is struck by the obstacle, thereby reducing the impact forces on said obstacle.

* * * * *